(12) United States Patent
Baer et al.

(10) Patent No.: US 11,111,714 B2
(45) Date of Patent: Sep. 7, 2021

(54) MOVABLE BARRIER OPERATOR WITH INTEGRATED CAMERA MODULE

(71) Applicant: The Chamberlain Group, Inc., Oak Brook, IL (US)

(72) Inventors: Matthew James Baer, Bloomingdale, IL (US); Jimmy Bedolla, Munster, IN (US); Matthew Peter Crane, Elmhurst, IL (US); Corey Lyn Herrboldt, Plainfield, IL (US); Sapta Gireesh Pudipeddi, Hoffman Estates, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 16/815,792

(22) Filed: Mar. 11, 2020

(65) Prior Publication Data
US 2020/0291714 A1 Sep. 17, 2020

Related U.S. Application Data

(60) Provisional application No. 62/817,308, filed on Mar. 12, 2019, provisional application No. 62/942,368, filed on Dec. 2, 2019.

(51) Int. Cl.
| | | |
|---|---|---|
| *E05F 15/73* | (2015.01) | |
| *E05F 15/668* | (2015.01) | |
| *E05F 15/77* | (2015.01) | |
| *F16M 11/20* | (2006.01) | |

(Continued)

(52) U.S. Cl.
CPC ............ *E05F 15/73* (2015.01); *E05F 15/668* (2015.01); *E05F 15/77* (2015.01); *F16M 11/2014* (2013.01); *G03B 17/561* (2013.01); *E05F 2015/767* (2015.01); *E05Y 2900/106* (2013.01); *G07C 2009/00928* (2013.01)

(58) Field of Classification Search
CPC ......... E05F 15/668; E05F 15/73; E05F 15/77; E05F 2015/767; E05Y 2900/106; F16M 11/2014; G03B 17/561; G07C 2009/00928; G07C 9/00309; G07C 9/00571; G07C 9/33
See application file for complete search history.

(56) References Cited

U.S. PATENT DOCUMENTS

| | | |
|---|---|---|
| 8,360,662 B1 | 1/2013 | Harvey |
| 9,756,233 B2 | 9/2017 | Lee |
| 10,713,869 B2 * | 7/2020 | Morris .................. E05F 15/668 |

(Continued)

OTHER PUBLICATIONS

Chamberlain Secure View & Corner to Corner Lighting; Built-in Camera & Ultra Bright Smart Garage Door Opener; RET4967-359-Hawkeye-Sellsheet-B6765; Nov. 1, 2019.

(Continued)

*Primary Examiner* — Nader Bolourchi
(74) *Attorney, Agent, or Firm* — Fitch, Even, Tabin & Flannery LLP

(57) ABSTRACT

In one aspect, a movable barrier operator includes a housing and a motor. The movable barrier operator further includes a camera mount that is connected to the housing and that supports a camera. The camera mount is configured to facilitate movement of the camera between a storage position wherein at least a portion of the camera is inside the housing and an operative position wherein the at least a portion of the camera is outside of the housing.

24 Claims, 17 Drawing Sheets

(51) Int. Cl.
*G03B 17/56* (2021.01)
*G07C 9/00* (2020.01)

(56) References Cited

U.S. PATENT DOCUMENTS

| | | |
|---|---|---|
| 2004/0107639 A1 | 6/2004 | Mullet |
| 2015/0258944 A1 | 9/2015 | Buschmann |
| 2016/0093180 A1 | 3/2016 | Fitzgibbon |
| 2019/0043290 A1 | 2/2019 | Morris |

OTHER PUBLICATIONS

Chamberlain Secure View; Built-in Camera & Ultra Bright Smart Garage Door Opener; RET4967-358-Hawkeye-Sellsheet-B4545; Nov. 1, 2019.
Liftmaster; DC Battery Backup Belt Drive Wi-Fi with Integrated Camera Garage Door Opener; Nov. 1, 2019.
Momentum; Niro Wi-Fi Garage Coor Controller with Built-In Camera; Momentum Home Automation; MOGA-001; Dec. 6, 2019; https://momentumcam.com/roducts/garage-door-controller; 9 pages. [Believed to have been publicly available prior to earliest claimed priority date.].
International Search Report and Written Opinion; PCT/US2020/022248; dated Sep. 9, 2020; 14 pages.

\* cited by examiner

MOVABLE BARRIER OPERATOR WITH INTEGRATED CAMERA MODULE

CROSS-REFERENCE TO RELATED APPLICATIONS

This application claims the benefit of U.S. Provisional Application No. 62/817,308, filed Mar. 12, 2019, entitled MOVABLE BARRIER OPERATOR WITH INTEGRATED CAMERA MODULE, and U.S. Provisional Application No. 62/942,368, filed Dec. 2, 2019, entitled MOVABLE BARRIER OPERATOR WITH INTEGRATED CAMERA MODULE, both of which are hereby incorporated by reference in their entireties herein.

FIELD

This disclosure relates generally to movable barrier operators and, more particularly, to movable barrier operators that include cameras.

BACKGROUND

Movable barrier operators, such as garage door openers, move barriers in response to signals received from remote controls. A camera may be provided to monitor a secured area associated with the movable barrier operator, such as the interior of a garage. The camera may communicate images and/or video of the interior of the garage to a user device, such as a smartphone, of an end user. One problem with prior cameras for use with movable barrier operators is that they are stand-alone devices that the end user installs in the garage, which may be inconvenient for some users.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one aspect of the present disclosure, a movable barrier operator includes a housing, and a motor and a controller in the housing. The movable barrier operator also includes a camera operably coupled to the controller, and a camera mount. The camera mount is configured to facilitate movement of the camera between a storage position and an operative position. In the storage position, at least a portion of the camera is inside the housing, and in the operative position, the at least a portion of the camera is outside of the housing.

In another aspect of the present disclosure, a movable barrier operator includes a housing, and a motor and a controller in the housing. The movable barrier operator also includes a camera that is operably coupled to the controller. The movable barrier operator also includes a fixed support, a rotatable support, and a pivotal support. The fixed support may be connected to the housing, with at least a portion of the fixed support in the housing. The rotatable support may be rotatably mounted to the fixed support. The pivotal support may be pivotally mounted to the rotatable support and may be configured to support the camera. The rotatable support may be rotatable relative to the fixed support to adjust the rotatable support to a rotary position relative to the fixed support and set a pan angle of the camera. The pivotal support may be pivotal relative to the rotatable support to adjust the pivotal support to a pivotal position relative to the rotatable support and set a tilt angle of the camera. The movable barrier operator may further include a pivot lock of the rotatable support and the pivotal support that may be configured to resist pivoting of the pivotal support relative to the rotatable support and maintain the set tilt angle of the camera.

Figure 1:
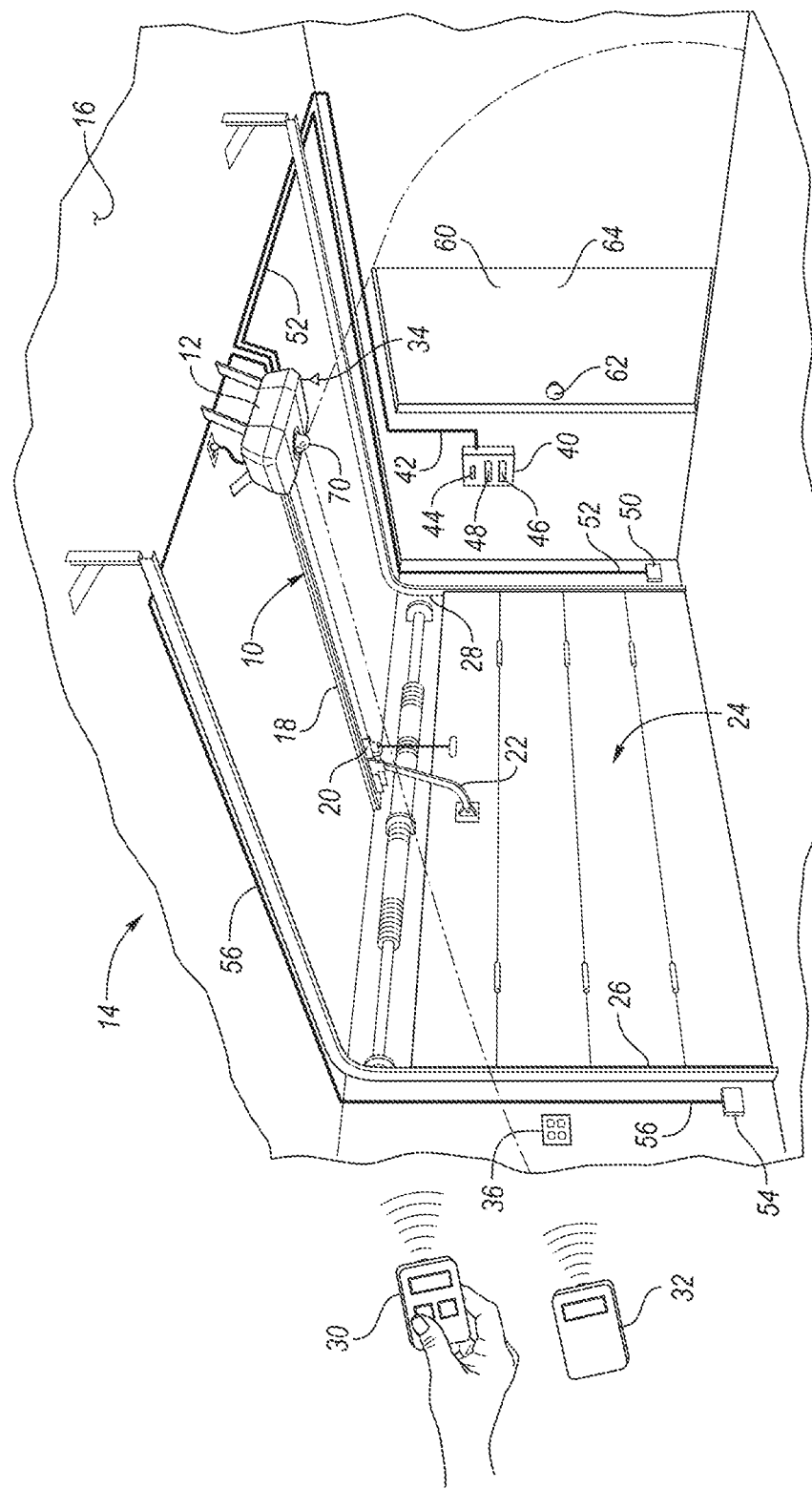
FIG. 1 is a perspective view of a garage that includes an example movable barrier operator and a passageway door.

Referring now to FIG. 1, a garage 14 having a movable barrier operator system 10 is shown. The movable barrier operator system 10 may include a movable barrier operator 12, such as a garage door opener, mounted within a secured area, such as the garage 14. More specifically, the movable barrier operator 12 may be mounted to a ceiling 16 of the garage 14 and may include a rail 18. A releasable trolley 20 may be attached to the rail 18. The releasable trolley 20 may have an arm 22 extending to a multiple paneled garage door 24 positioned for movement along a pair of door tracks 26, 28. The movable barrier operator 12 may have a motor configured to open and close the door 24 via a coupling. In one embodiment, the coupling includes a belt, chain or screw shaft, the trolley 20, and the arm 22. Operation of the motor produces movement of the door 24.

The movable barrier operator system 10 may include one or more remote controls and the controller of the movable barrier operator 12 is configured to determine whether to operate in response to commands from the remote controls. The one or more remote controls may include portable transmitter units 30, 32 configured to send radio frequency signals for reception by communication circuitry including an antenna 34 of the movable barrier operator 12. The remote controls may also include an external control pad 36, with a button or buttons thereon, that may be positioned on the outside of the garage 14. The external control pad 36 may communicate signals via radio frequency transmission for reception by the antenna 34 of the movable barrier operator 12. Other examples of remote controls include user devices such as smartphones, tablet computers, personal computers, and smartwatches that are operable to control operation of the movable barrier operator 12 over one or more networks such as the internet.

A wall control or switch module 40 may be mounted within (e.g. on a wall) the garage 14. The switch module 40 may be connected to the movable barrier operator 12 by one or more wires 42, although the switch module 40 may alternatively communicate with the movable barrier operator 12 wirelessly or via a combination of wired and wireless signals. The switch module 40 may include one or more of a light switch 44, a lock switch 46, and a command switch 48.

An optical emitter 50 may connected via a power and signal line 52 to the movable barrier operator 12. An optical detector 54 may be connected via a line 56 to the movable barrier operator 12. Alternatively, at least one of the optical emitter 50 and the optical detector 54 may communicate wirelessly with the movable barrier operator 12. Furthermore, the optical emitter 50 and the optical detector 54 may be combined as a single unit known in the art as a retroreflector.

The garage 14 may include a passageway door 60 having a door lock 62, such as a doorknob, latch, deadbolt, or any combination thereof. The door 60 may separate the garage 14 from an adjacent area or attached structure, such as a house, that may be desired to be secured in certain instances. The door 60 may have a first surface 64 facing the interior of the garage 14 and an opposite, second surface facing the interior of the house.

Figure 2:
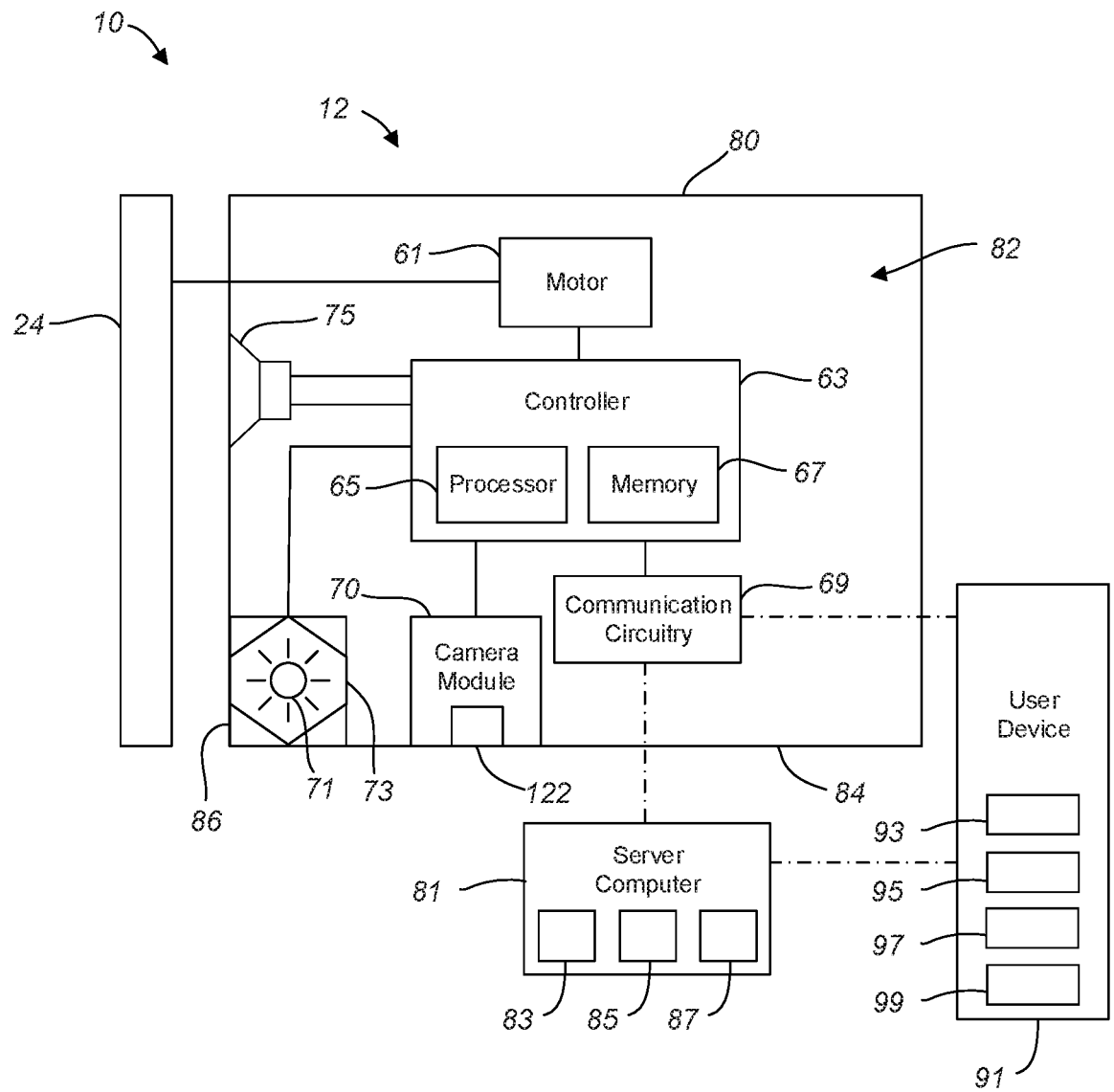
FIG. 2 is an example block diagram of the movable barrier operator of FIG. 1.

Referring to FIG. 2, the movable barrier operator 12 includes a motor 61 that is operable to move a movable barrier from an open position to a closed position (and vice versa). The movable barrier operator 12 may also include circuitry such as, for example, a controller 63 having a processor 65 and a non-transitory computer readable memory 67 to control the motor 61 and manage other hardware and/or software features.

The movable barrier operator 12 may further include a light 71 and a light lens or cover portion 73. In one approach, the light cover 73 forms part of the housing 80. The controller 63 is configured to effect illumination by the light 71; for example, to illuminate an ambient environment. The movable barrier operator 12 may further include a sound generator such as a speaker 75. The controller 63 is configured effect generation of a sound by the speaker 75.

The movable barrier operator 12 also includes communication circuitry 69. The communication circuitry 69 may communicate wirelessly with one or more remote controls and may include a receiver, a transmitter, and/or a transceiver. The communication circuitry 69 may be configured to communicate via one or more approaches, such as radio frequency communications utilizing different frequencies and one or more protocols. For example, the communication circuitry 69 may communicate via 300 MHz-400 MHz radio frequency signals with transmitters 30, 32 and with user devices (such as user device 91) via a Wi-Fi connection to a local wireless network and the internet. The communication circuitry 69 may be configured to communicate with remote controls and other remote devices using other approaches such as Bluetooth®, ZigBee, ultrasonic signals, and/or infrared (IR) signals. A wired or wireless gateway may permit the movable barrier operator 12 to access an external network, such as the internet. The gateway may be a router, digital assistant, or a smart house hub, as some examples.

The communication circuitry 69 is configured to connect the movable barrier operator 12 with a remote computer, such as a server computer 81, over a network to exchange information. The server computer 81 may include one or more processor-based devices that communicate with a plurality of user devices 91 and a plurality of movable barrier operators 12. The server computer 81 comprises a processor 83 and a communication interface 85. The processor 83 may comprise one or more of a central processing unit (CPU), a microprocessor, a microcontroller, an application specific integrated circuit (ASIC), and the like. The processor 83 is configured to execute computer-readable instructions stored on a non-transitory computer-readable memory 87 of the server computer 81.

The communication interface 85 includes circuitry configured to connect the processor 83 to the network and exchange messages with user devices 91 and movable barrier operators 12. In some embodiments, the server computer 81 may be further configured to use the communication interface 85 to exchange access information with servers operated by third-party service providers such as home security services, smart home systems, parking space reservation services, hospitality services, package/parcel delivery services, and the like. In some embodiments, the communication interface 85 may comprise one or more of a network adapter, a network port or interface, a network modem, a router, and/or a network security device.

The user device 91 may include or be a smartphone, a smartwatch, a laptop computer, a tablet computer, a personal computer (PC), and/or an internet of things (IoT) device as some examples. Other examples of the user device 91 include an in-vehicle computing device such as a digital dashboard, center stack, and/or an infotainment, navigation or telematics system. The user device 91 includes a processor 93, communication circuitry 95, a user interface 97, and a memory 99.

The processor 93 may comprise one or more of a central processing unit (CPU), a microprocessor, a microcontroller, an application specific integrated circuit (ASIC) and the like. The processor 93 may be configured to execute computer-readable instructions stored on a memory 99 of the user device 91 to provide, for example, a graphical user interface (e.g. relative to a client application executed by the processor 93) on a display of the user interface 97. In some embodiments, the graphical user interface may be associated with or include at least one of a mobile application, a desktop application, a web-based user interface, a website, an augmented reality image, and a holographic image.

The communication circuitry 95 is configured to connect the user device 91 with the server computer 81 over a network, such as a cellular network and the internet, to exchange information. The communication circuitry 95 may, for example, send a status change request for a movable barrier to the server computer 81 and receive movable barrier status information and error messages from the server computer 81. The communication circuitry 95 may also receive from the server computer 81 data representative of pictures, videos, and/or sound captured by the camera module 70 that was communicated to the server computer 81 by the communication circuitry 69 of the movable barrier operator 12. The communication circuitry 95 may also communicate information with the movable barrier operator 12 and/or the server computer 81 to initialize and/or register the movable barrier operator 12 (that includes the camera module 70) or the camera module 70 itself.

In some embodiments, the communication circuitry 95 may be further configured to communicate with other devices, such as the transmitter 30 or transmitter 32 of FIG. 1. For example, the communication circuitry 95 may receive a state change request for the movable barrier operator 12 from the transmitter 30 when the transmitter 30 is outside of the range of the transmitter 30 so that the user device 91 may communicate the state change request to the movable barrier operator 12 over a wide area wireless network, e.g., a cellular network.

In some embodiments, the communication circuitry 95 may be further configured to directly communicate with the movable barrier operator 12. For example, the user device 91 may communication with the movable barrier operator 12 via a short-range wireless communication protocol, such as pairing using Bluetooth®. As another example, the movable barrier operator 12 may broadcast a beacon signal that is received by the user device 91. The user device may present data from the beacon signal to the server computer 81 as evidence that the user device 91 is in proximity to the movable barrier operator 12.

The communication circuitry 95 may comprise, for example, at least one of a network adapter, a network port, a cellular network radio (3G, 4G, 4G-LTE, and/or 5G) interface, a Wi-Fi transceiver, a Bluetooth® transceiver, a mobile data transceiver, and the like.

The user interface 97 of the user device 91 comprises one or more user input/output devices. In some embodiments, the user interface 97 comprises at least one of a display screen, a touch screen, a microphone, a speaker, one or more buttons, a keyboard, a mouse, an augmented reality display, a holographic display, and the like. The user interface 97 is generally configured to allow a user to interact with the information provided by the user device 91, such as a graphical user interface for pairing transmitters 30, 32 and movable barrier operators 12. In some embodiments, the user interface 97 on the user device 91 may comprise an optical sensor such as a camera configured to capture images and/or videos.

The movable barrier operator 12 may include a camera mount, such as camera module 70. As discussed in greater detail below, the camera module 70 may include a camera 122 that is situated to capture security data such as still images/pictures, video, and/or audio within the garage 14. The camera module 70 may be configured to continuously capture security data. Alternatively, the camera module 70 may capture security data at certain times. For example, the camera module 70 may be configured to start capturing security data when the movable barrier operator system 10 opens the garage door 24 or shortly before the movable barrier operator 12 starts to open the garage door 24. The camera module 70 may continue to capture security data until the garage door 24 is closed or for a predetermined amount of time after the garage door 24 is closed. In further examples, the camera module 70 may be configured to start capturing security data in response to the movable barrier operator system 10 receiving an open command that includes information indicating an entity with limited access permission has requested opening of the garage door 24.

One or more components of the camera module 70 (e.g., the camera 122, a control module, etc.) may be electrically powered by the movable barrier operator 12, for example, via a wired connection. In still another approach, one or more components of the camera module 70 may be powered via a battery, which may be, for example a rechargeable battery.

The camera module 70 may be a user-adjustable module. As such, various parameters (e.g., pan, tilt, etc.) may be customized or otherwise configured. In this way, a user may adjust the field of view of the camera of the camera module 70. In one embodiment, the camera module 70 may be manually moved (e.g., "by hand"). Additionally or alternatively, the camera module 70 may be remotely controllable. For example, a user may adjust the camera module 70 using a user device such as a smartphone, tablet, or personal computer. In some forms, the movable barrier operator 12 or the camera module 70 may include one or more servo motors. As such, a user viewing a video stream from the camera module 70 via a remote device can adjust one or more aspects (e.g., pan, tilt, zoom) of the camera module 70 in real time to change the field of view of the camera.

The movable barrier operator 12 may store programmed orientations for the camera module 70 and may adjust the orientation of the camera module 70 based on the operation of the movable barrier operator system 10. For example, the camera module 70 may be positioned to have the field of view encompass the passageway door 60 when the garage door 24 is closed and the movable barrier operator 12 may reconfigure the camera module 70 to have the field of view encompass the garage door 24 when the garage door 24 is opened.

In some forms, one or both of the movable barrier operator 12 and the camera module 70 may further include a speaker and/or a microphone such that verbal communications may be exchanged between a person located in or near the garage 14 and a remote user.

In some embodiments, the camera 122 may operate as a device to monitor motion and recognize gestures or situations of interest (e.g., the presence of people, objects, or devices). For example, the camera 122 may operate as a motion sensor. In some approaches, the camera 122 may monitor and/or perform analytics such as facial recognition and the detection of specific vehicles and objects.

The movable barrier operator 12 includes a housing 80. In one form, the housing 80 is configured to receive the motor 61, the controller 63, the communication circuitry 69, the light 71, the speaker 75, and/or the camera module 70.

In one approach, the camera module 70 is integrated into the housing 80. For example, at least a portion of the camera module 70 may be disposed within an internal cavity 82 defined at least in part by the housing 80. At least a portion of the camera module 70 may extend through a wall or surface of the housing 80. For example, at least a portion of the camera module 70 may extend through a lower wall 84 of the housing 80 such that at least a portion of the camera module 70 is disposed at an exterior of the housing 80. As used herein, a lower wall 84 of the housing 80 may refer to a wall having a surface that faces in the general direction of the floor of the garage 14. The camera module 70 may be disposed at, or proximate to, another surface of the housing 80, such as a forward surface 86 of the housing 80 that faces the garage door 24. Furthermore, the camera module 70 may be entirely disposed within the internal cavity 82 of the housing 80 such that no portion of the camera module 70 extends to an exterior of the housing 80.

In operation, with reference to FIGS. 1 and 2, the movable barrier operator 12 may receive a command from a remote control in response to a user input at the remote control. The camera module 70 captures pictures, video, and/or sound from within the garage 14 that is provided to a user device of a user, such as an owner of the house containing the garage 14, so that the user may monitor the interior of the garage 14. In one example, a delivery associate enters a one-time use code at the external keypad 36 to cause the movable barrier operator 12 to open the garage door 24 and the delivery associate places a package in the garage 14. The pictures, video, and/or sound from the camera module 70 permits the owner of the house to confirm the delivery associate has delivered the package at the requested position in the garage 24.

More specifically, the command from a remote control to the movable barrier operator 12 may be transmitted, for example, from the keypad 36, one of the portable transmitters 30, 32, or a user device. If the command is sent using the keypad 36, the keypad 36 sends a code entered by a user to the movable barrier operator 12. A controller 63 of the movable barrier operator 12 parses and decrypts the command to determine whether the code(s) are valid and may further determine the permissions associated with the identified remote control and/or user. Among the permissions determined by the movable barrier operator 12 is whether to operate the door lock 62 associated with a door 60 to give access to the house (e.g., via unlocking a lock). For example, a delivery associate may enter a temporary code at the keypad 36 and the movable barrier operator 12 identifies the temporary code as indicating the delivery associate has permission to open the garage door 24 but not the passageway door 60.

As discussed, the command may be sent using a user device. The user device may be a smartphone or tablet communicatively coupled to the movable barrier operator 12 by one or more networks, such as a wide area network (e.g., a cellular network) and the internet. For example, a user may send open or close commands to the movable barrier operator 12 using an application running on the user's smartphone. The user's smartphone may communicate with a remote resource, such as a server, via a cellular telephone system and/or the internet. In response to receiving the communication from the user's smartphone, the remote resource sends a command to the movable barrier operator 12 via the internet. The command may include data representing the identity of the smartphone, the identity of the user, and/or a code associated with the movable barrier operator 12.

In one example approach, if an identified user is permitted access to the garage 14 and the house, the movable barrier operator 12 may transmit a signal to the door lock 62 containing a command to unlock the passageway door 60 upon the movable barrier operator 12 receiving an open command from a user device associated with the user. The door lock 62 may receive the command at communication circuitry of the door lock 62 and may actuate a deadbolt of the door lock 62 into an unlocked or retracted position. In some forms, the signal transmitted to the door lock 62 is encrypted, and the door lock 62 includes a controller configured to decrypt the signal. The signal may be sent via wired or wireless approaches.

If the identified user is permitted access to the garage 14 but is not permitted access to the house, the movable barrier operator 12 may transmit a signal containing a lock command to the door lock 62 upon receiving an open command from a user device associated with the user. The door lock 62 may receive the signal at the communication circuitry of the door lock 62 and, in response, may actuate the deadbolt of the door lock 62 into a locked or extended position. The movable barrier operator 12 may thereby cause the door lock 62 to secure the door 60 before or concurrent with the movable barrier operator 12 starting to open the garage door 24 if the user initiating the command is not authorized to enter the house. If the movable barrier operator 12 receives the signal from a remote control that is not authorized, or is not associated with an authorized user, the movable barrier operator 12 does not open the garage door 24.

Figure 3:
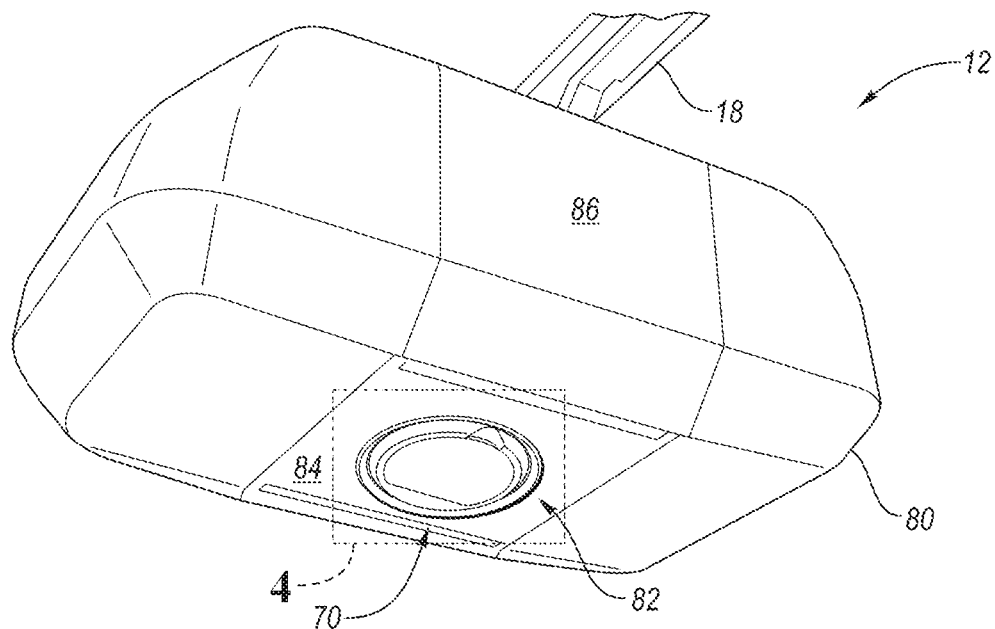
FIG. 3 is a bottom perspective view of an example movable barrier operator that includes an integrated camera module, showing the camera module in a closed or storage configuration.
Figure 4:
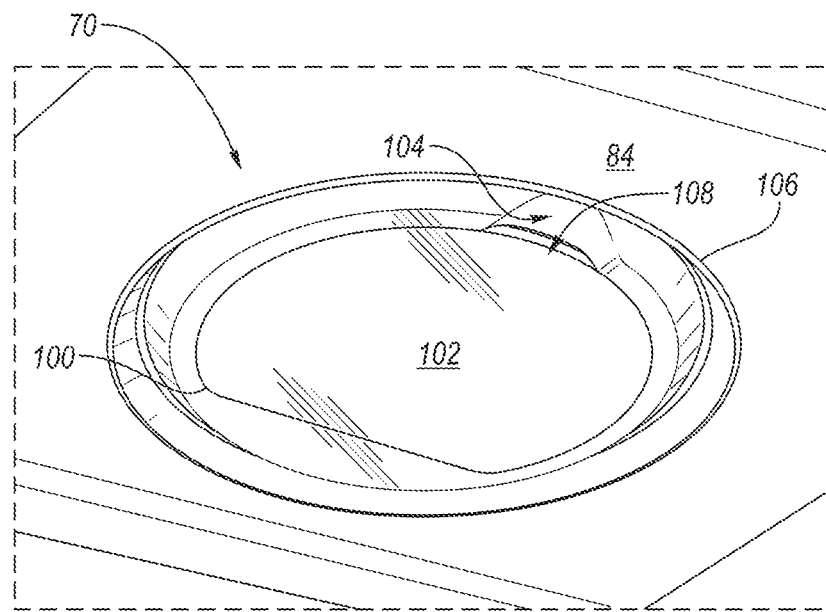
FIG. 4 is an enlarged view of the portion of the movable barrier operator in the dashed circle of FIG. 3, showing details of an example camera module.
Figure 5:
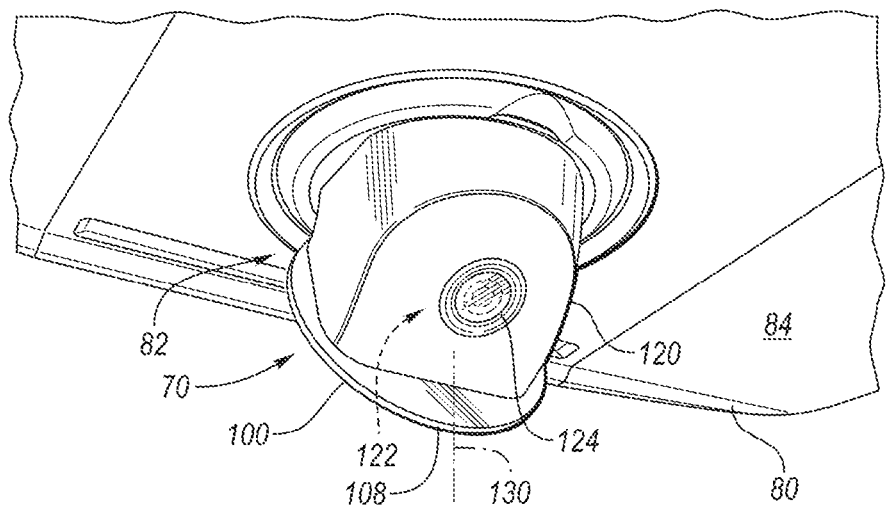
FIG. 5 is a bottom perspective view similar to FIG. 4 showing the example camera module in an open or operative configuration.

Referring to FIGS. 3-5, the camera module 70 may be adjustable between a closed or retracted configuration (FIGS. 3 and 4) and an open or extended configuration (FIG. 5). The camera module 70 may further be adjustable to one or more intermediate, or partially-opened, configurations. The closed configuration may facilitate storage of at least a portion of the camera 122 within the housing 80. In an example closed configuration, the at least a portion of the camera 122 that is inside or within the housing 80 may be the lens 124 and/or a substantial part of the camera housing 120. Such a position may be desirable, for example, during storage, shipping, or handling (e.g., installation) of the movable barrier operator 12, or when a user intends to deactivate the camera 122. As such, the camera position shown in FIGS. 3 and 4 may be referred to as a storage position. As the camera 122 may be operable when in the position shown in FIG. 5, this position may be referred to as an operative position.

Regarding FIG. 4, in the closed configuration an exterior portion of the camera module 70 may be disposed in close proximity to the exterior of the housing 80. For example, a lower wall portion, such as an exterior surface 102, of a door 100 of the camera module 70 may be level (e.g., substantially flush) with an exterior surface of the lower wall 84.

The camera module 70 may include an affordance 104 configured to permit a user to grasp a portion of the camera module 70 and extend or otherwise reconfigure the camera module 70 from the closed configuration to the open configuration. For example, the camera module 70 includes a peripheral rim or cover 106 and the affordance 104 includes a recess or indent in the cover 106 that permits a user to access and engage a handle portion 108 of the camera module 70. The handle portion 108 may be a portion of the door 100, a portion of a camera housing 120 (see FIG. 5), a combination of portions of the door 100 and the camera housing 120, or another portion of the camera module 70. The camera housing 120 is mounted to the door 100 and moves with pivoting movement of the door 100. In this way, a user may pull generally downward on the handle portion 108 to move the door 100 and camera housing 120 from the closed configuration, shown in FIGS. 3 and 4, to an open configuration shown in FIG. 5.

Referring to FIG. 5, the door 100 has been pivoted downwardly by a user toward a floor of the garage 14 so that the camera module 70 is in an open configuration. The camera housing 120 includes the camera 122, which may include a lens 124. The camera housing 120 may further contain or otherwise include at least one of a microphone, a speaker, an infrared emission device (e.g., light-emitting diode or other infrared source), an infrared detector, a proximity sensor, and a light sensor (e.g., an ambient light sensor). The camera housing 120 may further contain or otherwise include one or both of a memory and a processor. Additionally, the camera housing 120 may be configured with one or more apertures or openings so components (e.g., a microphone, a speaker, etc.) may be in communication with the ambient environment.

The camera housing 120 includes a window portion, such as an opening, and the camera lens 124 is positioned in the opening. In another embodiment, the window portion of the camera housing 120 includes a transparent or translucent member. The window portion may facilitate operation of the camera 122 such as by permitting light to pass through to the camera lens 124.

The camera module 70 may permit user-controllable pan and tilt operations. For example, the camera module 70 may permit the door 100 and camera housing 120 to pivot between closed and open configurations and have various minimum and maximum tilt angles relative to the housing 80. The door 100 and camera housing 120 have a minimum tilt angle, e.g., zero degrees, when the camera housing 120 is in a closed configuration as depicted in FIGS. 3 and 4. The door 100 and the camera housing 120 have a maximum tilt angle when the door 100 and camera housing 120 are in a fully open configuration. The maximum tilt angle may be set by one or more physical stops on one or more components of the camera module 70. The maximum tilt angle may be selected as a function of the field of view of the camera 122. For example, in one embodiment, the door 100 and camera housing 120 may be adjusted between approximately zero degrees (i.e., the closed configuration) and approximately fifty-five degrees (the open configuration). In one embodiment, the door 100 and camera housing 120 may be pivoted to an intermediate, partially open configuration having a tilt angle of approximately thirty-five degrees.

When the door 100 and camera housing 120 are opened to the maximum tilt angle, the field of view of the camera 122 may encompass a portion of the garage 14 disposed directly below the camera module 70 (e.g., along a central axis 130 that extends through the camera module 70).

In one embodiment, the camera module 70 may provide a user with feedback to inform the user during tilting operation of the camera housing 120. User feedback may include, for example, haptic (e.g., tactile) feedback, visual feedback, audio feedback, or any combination thereof.

In one embodiment, the camera module 70 may permit the door 100 and camera housing 120 to turn about the central axis 130 and pan the field of view of the camera 122 when the door 100 and camera housing 120 are in the open and intermediate positions. In one embodiment, the door 100 and camera housing 120 may rotate through a full 360 degree rotation about the central axis 130. In another embodiment, the camera module 70 may be provided with one or more abutment stops to limit the range of rotary motion of the camera housing 120 about the central axis 130. For example, the door 100 and camera housing 120 may be permitted to rotate approximately 345 degrees about the central axis 130, with an abutment stop being provided to inhibit full rotation about the central axis 130. The rotation of the door 100 and camera housing 120 about the central axis 130 may be limited to predetermined angular increments by one or more ratchet mechanisms as discussed hereinafter. In this manner, the door 100 and camera housing 120 may be turned around the axis 130 to provide a desired pan angle for the field of view of the camera 122 as well as pivoted downward from the closed configuration to the intermediate or open configuration and provide a desired tilt angle for the field of view of the camera 122. This permits the camera 122 to readily encompass a desired field of view in many different sizes and configurations of secured areas such as the garage 14. The pivoting and turning of the door 100 and camera housing 120 connected thereto may be performed by the user physically manipulating the door 100 and/or via the user operating one or more actuators of the camera module 70.

Figure 6:
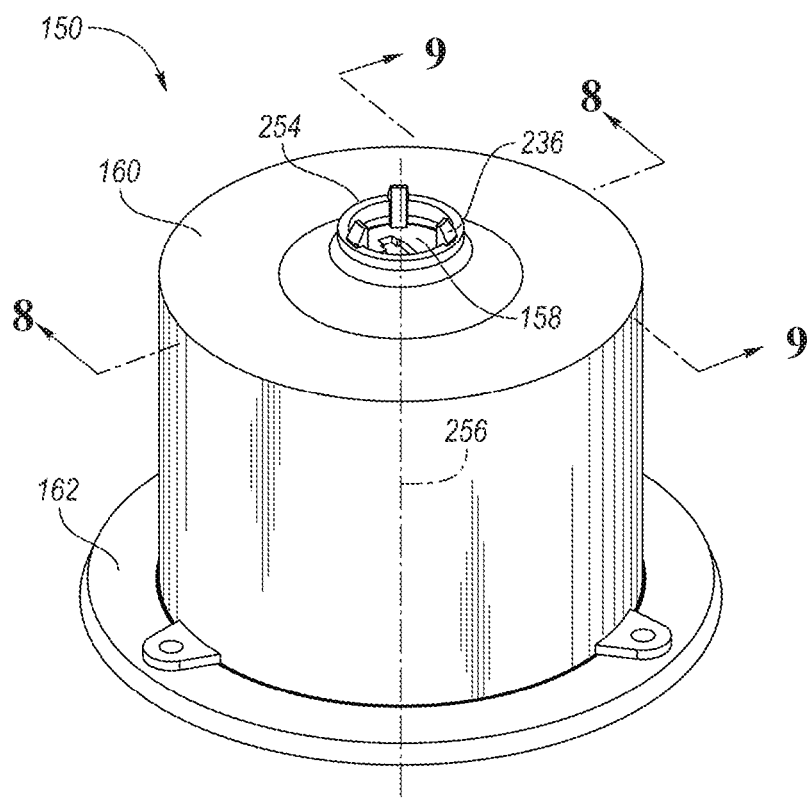
FIG. 6 is a top perspective view of an example camera module, shown isolated from a movable barrier operator.
Figure 7:
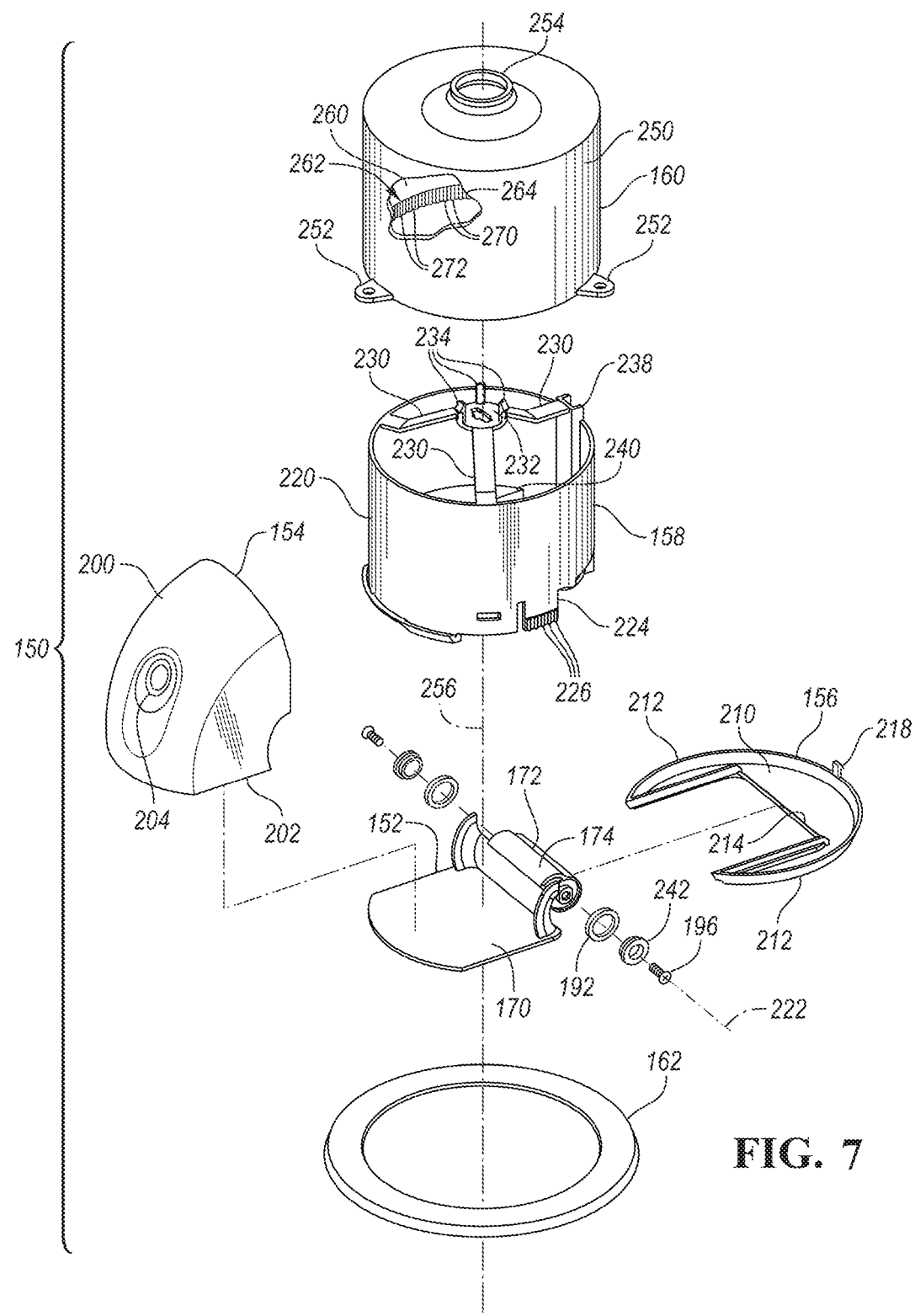
FIG. 7 is an exploded view of the camera module of FIG. 6.

Referring now to FIGS. 6 and 7, a camera mount such as camera module 150 is shown that is similar in many respects to the camera module 70 discussed above. The camera module 150 may include one or more of a pivotal support (which may be in the form of a door 152), a camera housing 154, and an inner cover 156. The camera module 150 may further include a rotatable support, such as rotatable housing 158, and a fixed support, such as fixed housing 160. The camera module 150 may further include an outer cover 162. The housings 158, 160 are received in an interior of a movable barrier operator, such as movable barrier operator 12. Additionally, the door 152, inner cover 156, and outer cover 162 are substantially flush with an outer surface of the movable barrier operator when the camera module 150 is disposed in the closed configuration.

Figure 8:
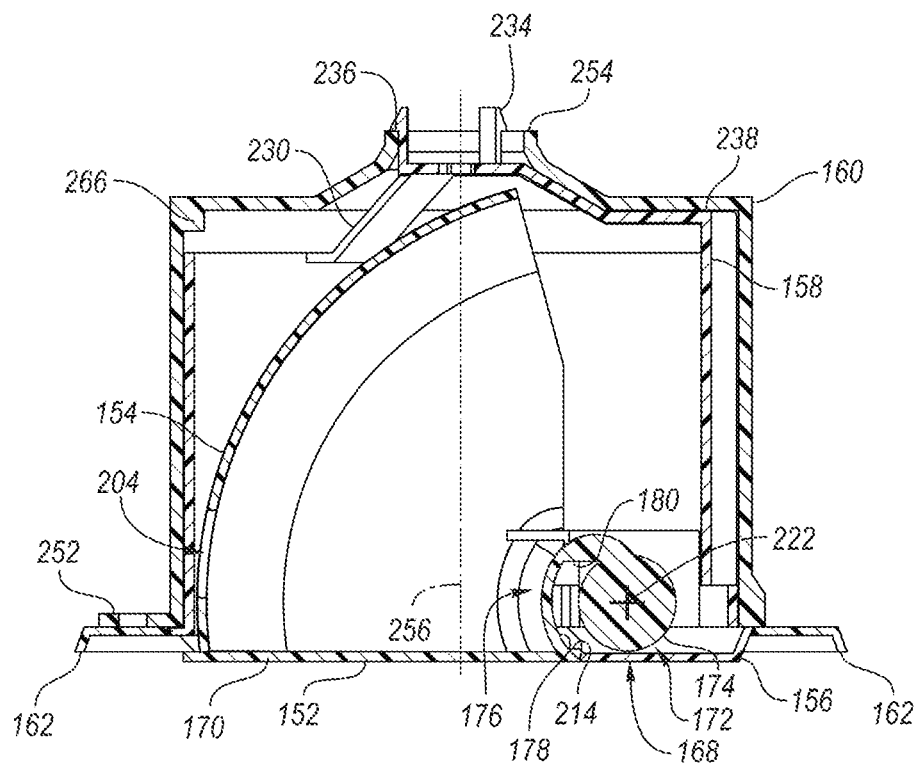
FIG. 8 is a cross-sectional view taken along the line 8-8 in FIG. 6 showing the camera module in a closed or storage configuration.

Referring momentarily to FIG. 8, the door 152 may include a floor 170 connected to the camera housing 154. The camera module 150 has a friction hinge 168 that maintains the door 152 and camera housing 154 at a closed, intermediate, or open position and resists vibrations caused by operation of the associated movable barrier operator. In one embodiment, the friction hinge 168 includes a hinge portion 172 of the door 152. The floor 170 may be generally planar. The hinge portion 172 may include a generally cylindrical body 174. The hinge portion 172 may further include a connecting portion 176 that extends between the cylindrical body 174 and the floor 170. The connecting portion 176 may include a curved wall 178 that extends from the floor 170. The connecting portion 176 may further include a stop wall 180 that extends between the curved wall 178 and the generally cylindrical body 174.

Figure 9:
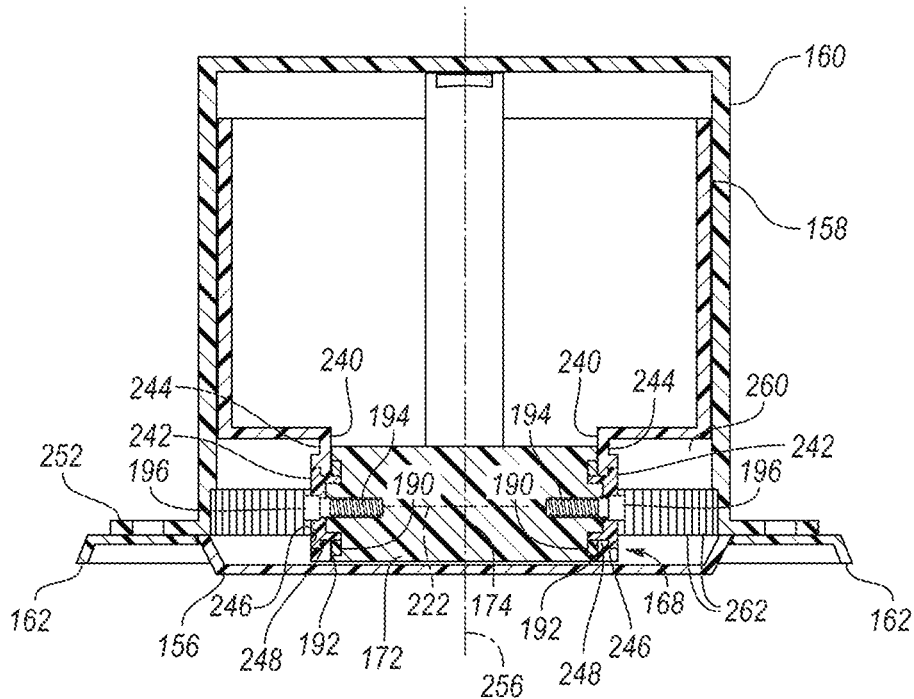
FIG. 9 is a cross-sectional view taken along the line 9-9 in FIG. 6.

Referring momentarily to FIG. 9, the generally cylindrical body 174 includes annular recesses 190 at opposing ends of the generally cylindrical body 174. Each annular recess 190 is adapted to receive a friction member, such as a spacer or washer 192, therein. The washer 192 may be made of a resilient material, such as rubber. The generally cylindrical body 174 may further include one or more openings such as a pair of blind bores 194 at opposite ends of the generally cylindrical body 174. The blind bores 194 are each adapted to receive a fastener 196. For example, the blind bores 194 may be threaded to receive threaded shanks of the fasteners 196.

Referring again to FIG. 7, the camera housing 154 is configured to be connected to the door 152 with a lower edge 202 of the camera housing 154 seated on the floor 170 of the door 152. The camera housing 154 has an arcuate wall 200 with an opening 204 or window. The camera housing 154 receives various components including, for example a camera, secondary sensors, and communication circuitry. In this way, the camera housing 154 may act as a shield to seal or otherwise protect various internally-disposed components. The lens of the camera may be positioned in the opening 204.

The inner cover 156 may include a base portion 210 and one or more arm portions 212 that extend from the base portion 210. The base portion 210 may be proximate the hinge portion 172 of the door 152. The arm portions 212 may be adapted to abut one or both of the floor 170 and the camera housing 154. For example, when the door 152 is in the closed configuration, the arm portions 212 may be disposed adjacent to the floor 170 of the door 152. When the door 152 is in an open configuration, the arm portions 212 may be disposed adjacent to generally planar right and left sides of the camera housing 154. The base portion 210 includes a stop surface 214. The stop surface 214 is positioned to contact the stop wall 180 of the door 152. In this way, the stop surface 214 and stop wall 180 form a hard stop that inhibits downward pivoting of the door 152 beyond the fully open configuration. The inner cover 156 may include one or more barbed tabs 218 that form a snap-fit connection with the rotatable housing 158.

The rotatable housing 158 has a body 220 that may be generally cylindrical. The rotatable housing 158 may further include one or more flexible tabs 224 such as two or three flexible tabs 224 angularly spaced about the rotatable housing 158. One or more of the flexible tabs 224 includes an engagement interface such as detents 226. In still other approaches, the engagement interfaces may include recesses and deflectable members as some examples.

The rotatable housing 158 may further include one or more support arms 230. The support arms 230 may extend from the generally cylindrical body 220 toward a central axis 256 of the rotatable housing 158. The support arms 230 may extend toward a hub portion 232. The rotatable housing 158 has one or more resilient tabs 234 upstanding from the hub portion 232. Referring momentarily to FIG. 8, each resilient tab 234 may include a barb 236 that forms a snap-fit connection with a support collar 254 of the fixed housing 160. Regarding FIG. 7, the rotatable housing 158 further includes a stop portion 238 of one of the support arms 230 that contacts a portion of the fixed housing 160 to inhibit complete rotational movement of the rotatable housing 158 about the central axis 256.

The friction hinge 168 of the camera module 150 may include an internal hinge bracket 240 of the rotatable hinge housing 158 that cooperates with the door 152 to at least partially form a pivot lock. The pivot lock may define pivot axis 222 for the door 152 and camera housing 154 carried thereon as shown in FIGS. 8 and 9. The internal hinge bracket 240 is configured to support the hinge portion 172 of the door 152. The friction hinge 168 includes one or more caps 242 at the internal hinge bracket 240. In one embodiment, the internal hinge bracket 240 includes a pair of walls 244 at opposite ends of the generally cylindrical body 174. Each wall 244 of the internal hinge bracket 240 includes a through opening and a countersink extending around the opening. The cap 242 includes a flange portion 246 that seats in the countersink and a tubular portion 248 that extends through the opening of the wall. The cap 242 may be formed, for example, of acetal or polypropylene.

With reference to FIG. 9, the friction hinge 168 provides frictional resistance to inhibit movement of the door 152 and camera housing 154 carried thereon. The frictional resistance is provided by the compression of the washers 192, which may be sandwiched between the generally cylindrical body 174 of the door 152 and the internal hinge bracket 240 of the rotatable housing 158. The washers 192 are initially compressed when positioned in the annular recesses 190 and the generally cylindrical body 174 of the door 152 is positioned between the walls of the internal hinge bracket 240 of the rotatable housing 158. Further, the fasteners 196 are tightened during assembly which urges the caps 242 together along the pivot axis 222. The caps 242 urge the walls 244 of the internal hinge bracket 240 axially together and compresses the washers 192 between the walls 244 and the ends of the cylindrical body 174.

Referring again to FIG. 7, the fixed housing 160 includes a body 250 that may be generally cylindrical. One or more attachment tabs 252 extend radially outward from the generally cylindrical body 250. For example, the fixed housing 160 may include three attachment tabs 252 that are angularly positioned about the generally cylindrical body 250. The attachment tabs 252 include holes sized to receive fasteners for connecting the camera module 150 to the housing of a movable barrier operator.

The support collar 254 of the fixed housing 160 is provided at an upper, central region of the fixed housing 160. The support collar 254 operates with the resilient tabs 234 to form snap-fit connections between the rotatable housing 158 and the fixed housing 160. The barbs 236 of the resilient tabs 234 are slidable along an upper annular surface of the support collar 254 as the rotatable housing 158 is turned relative to the fixed housing 160. In this way, the rotatable housing 158 may be secured to the fixed housing 160 while able to rotate about the central axis 256 (which may correspond to central axis 130 of FIG. 5).

Regarding FIG. 7, the camera module 150 has a rotation lock (e.g., a ratchet mechanism) that limits turning of the rotatable housing 158 to fixed rotational increments. In one example, the fixed housing 158 has an interior surface 260 of the fixed housing 160 that may be provided with one or more engagement features 262, as depicted in cutout 264 of FIG. 7. In one embodiment, the engagement features 262 extend around an entire inner circumference of the fixed housing 160. In another embodiment, the engagement features 262 may extend around less than the entire inner circumference of the fixed housing 160. The engagement features 262 may be in the form of ridges 270 and recesses 272 between the ridges 270. The detents 226 of the rotatable housing 158 snap radially outward into the recesses 272 and are shifted out of the recesses 272 in a radially inward direction via a camming action by the ridges 270 as the rotatable housing 158 is turned relative to the fixed housing 160. The flexible tabs 224 urge the detents 226 radially outward into engagement with the recesses 272. In this manner, the detents 226 ratchet over the ridges 270 of the fixed housing 160 and provide tactile feedback to the user of the turning of the rotatable housing 158. The engagement between the detents 226 and the recesses 272 also limits unintentional turning of the rotatable housing 158 that could be caused by vibration of the associated movable barrier operator to thereby maintain the set pan angle of the camera housing 154. The user may thereby be able to rotate the rotatable housing 158 in predefined and controlled increments, as provided by the interface between the detents 226 and the engagement features 262 of the fixed housing 160 to a desired pan angle of the camera.

Referring momentarily to FIG. 8, the fixed housing 160 may include an internal stop 266 such as a nub. The internal stop 266 contacts a portion of the rotatable housing 158, such as the stop portion 238, to inhibit full rotational movement of the rotatable housing 158 about the central axis 256.

Referring again to FIG. 7, the outer cover 162 may have an annular shape that extends around the door 152 and the inner cover 156. The outer cover 162 may have a press-fit engagement, snap-fit, or fastener-based connection with another component of the camera module 150 or the associated movable barrier operator. For example, the outer cover 162 may have a snap-fit connection with the fixed housing 160.

Figure 10:
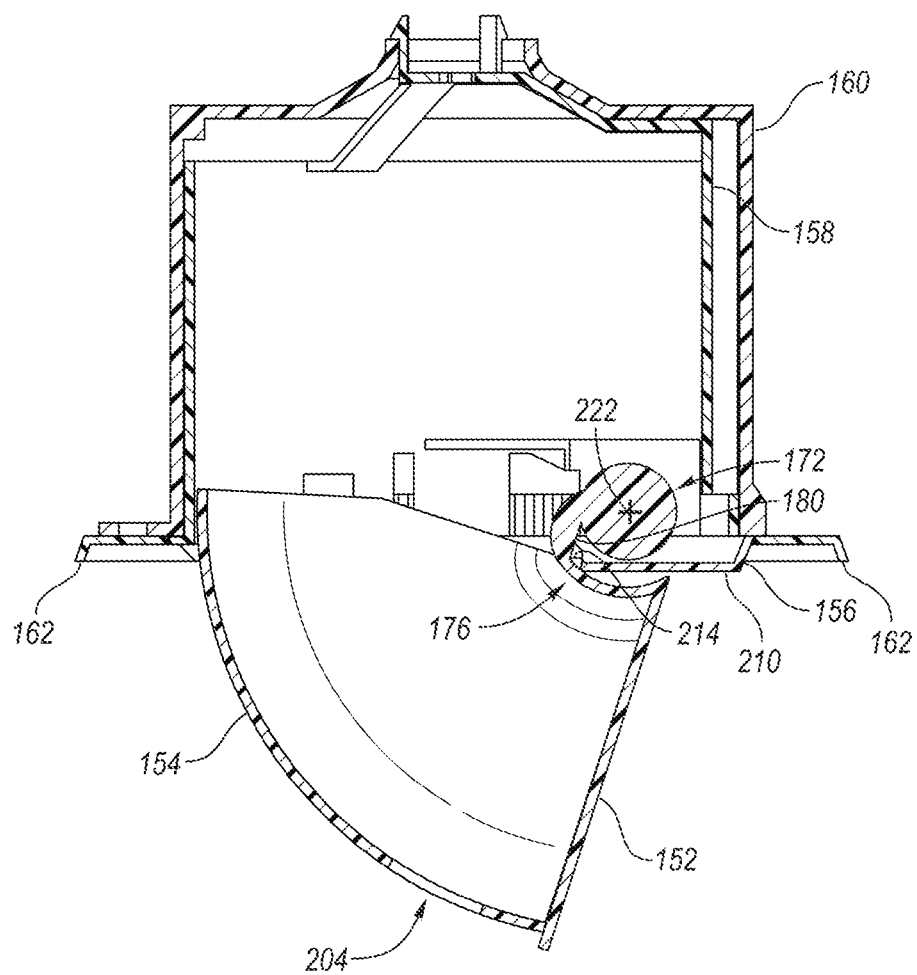
FIG. 10 is a cross-sectional view similar to FIG. 8 showing the camera module in an open or operative configuration.

Referring to FIGS. 8-10, the door 152 and camera housing 154 may be pivoted from a closed configuration (FIG. 8) to an open configuration (FIG. 10) to reconfigure the camera module 150 from a closed configuration to an open configuration. The stop surface 214 of the inner cover 156 contacts the stop wall 180 of the door 152 to limit downward pivoting of the door 152 beyond the fully open configuration.

The camera module 150 discussed herein may permit a user to manually control one or both of a pan and tilt orientation to provide the user with a desired field of view in an installed environment, such as the garage 14 of FIG. 1. The camera module 150 may be a Wi-Fi connected camera module that may mechanically tilt and pan. The camera module 150 may further be adapted to collapse into a movable barrier operator, for example, to protect the camera module 150 during packaging, storage, and shipment.

Figure 11:
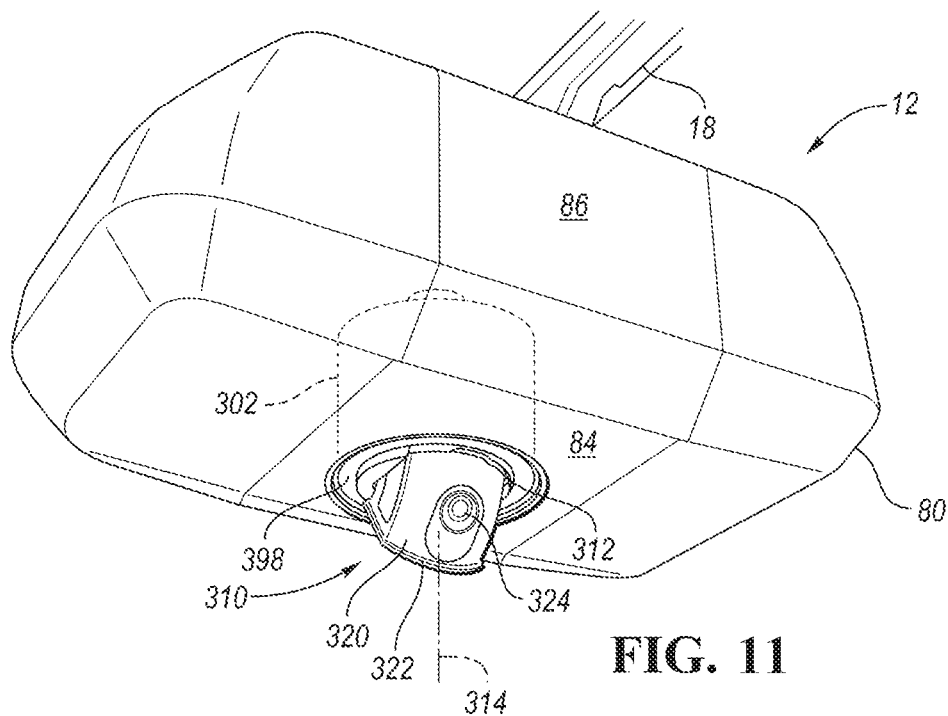
FIG. 11 is a front, bottom perspective view of an example movable barrier operator showing a camera module of the movable barrier operator in an open or operative configuration.
Figure 12:
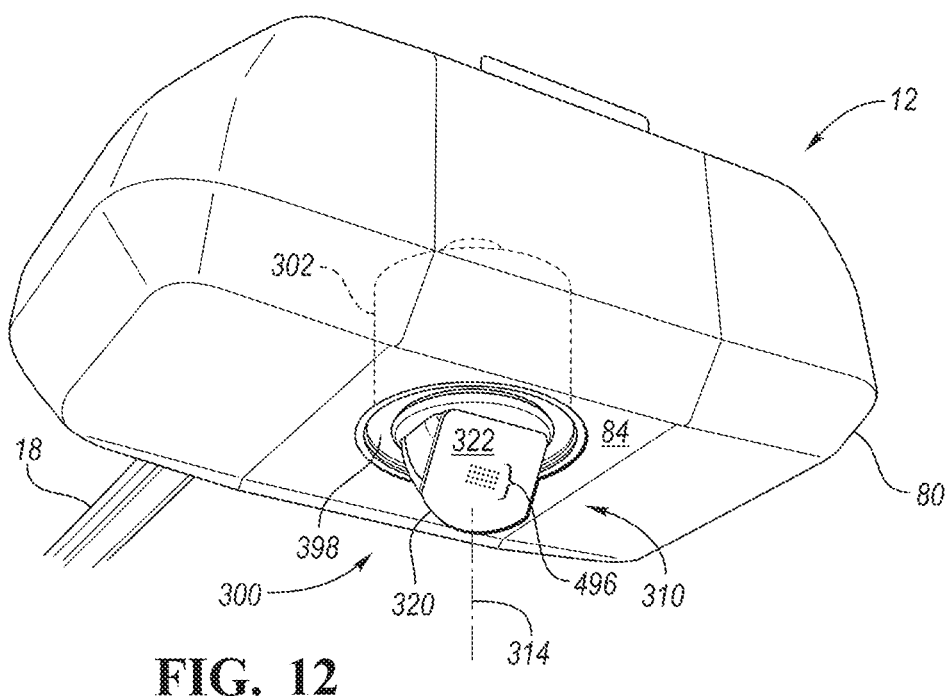
FIG. 12 is a rear, bottom perspective view of the movable barrier operator and camera module of FIG. 11.

Referring now to FIGS. 11 and 12, a camera mount such as camera module 300 is shown that is similar in many respects to camera module 70 and camera module 150 discussed above. As such, the camera module 300 may be utilized with the movable barrier operator 12 discussed with respect to FIGS. 1-5.

The camera module 300 includes a fixed support, such as an outer fixed housing 302, that is configured to be mounted to the housing 80 of the movable barrier operator 12. The camera module 300 further includes a rotatable module 310 that is connected to the fixed housing 302 and that is rotatable about an axis 314 relative to the fixed housing 302. The rotatable module 310 includes a rotatable support, such as an inner rotatable housing 312, that is substantially housed within the fixed housing 302. The rotatable module 310 also includes a camera assembly 320 that is pivotably connected to the rotatable housing 312 such that the camera assembly 320 may be rotated with the rotatable housing 312 about the axis 314 relative to the fixed housing 302. The camera assembly 320 may also be pivoted between a closed position and an open position. In the closed position, a pivotal support (which may be in the form of a door 322) of the camera assembly 320 is level (e.g., substantially flush) with the lower wall 84 of the housing 80 (e.g., similar to the position of the door 100 shown in FIGS. 3 and 4). In the open position, shown in FIGS. 11 and 12, at least a portion of a camera 324 of the camera assembly 320 is disposed outside of the housing 80 and is aimed generally forwardly and downwardly from the housing 80. In an example open configuration, the at least a portion of the camera assembly 320 that is outside the housing 80 may be the lens 324 and/or a substantial part of the camera housing such as arcuate wall 472 and opposing side walls 474 shown in FIG. 17.

Figure 13:
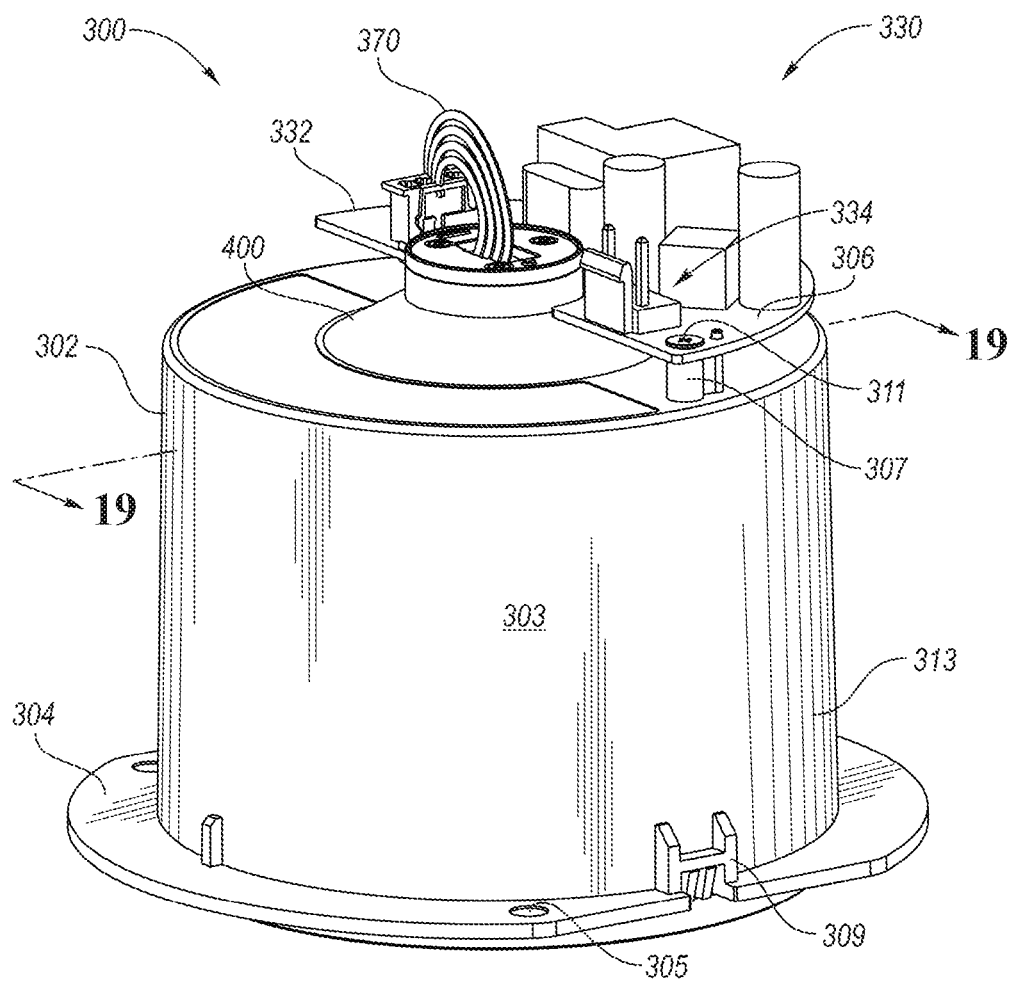
FIG. 13 is a perspective view of an example camera module, shown isolated from a movable barrier operator.

Referring now to FIG. 13, the fixed housing 302 has a body 303 that may be generally cylindrical or frustoconical. One or more peripheral flanges 304 extend away from a lower portion 313 of the body 303. Through-holes 305 in the flanges 304 are sized to receive fasteners for rigidly securing the fixed housing 302 to the housing 80 of the movable barrier operator 12. The fixed housing 302 may further include one or more snap landings 309 at the lower portion 313 of the body 303. The snap landings 309 may assist in angularly aligning the fixed housing 302 relative to the housing 80 during installation of the camera module 300 in the movable barrier operator 12. For example, the snap landings 309 may be received within corresponding notches in the lower wall 84 of the housing 80. In this way, the snap landings 309 may cooperate with the housing 80 to ensure that the camera module 300 is oriented forwardly within the garage 14 (e.g., in a direction of the garage door 24). Additionally or alternatively, the snap landings 309 may assist in installing the camera module 300 by providing an interference fit between the camera module 300 and the housing 80 prior to fastening of the flanges 304 to the housing 80.

A power supply assembly 330 may be secured to the fixed housing 302; for example, at an upper wall 306 of the fixed housing 302. The power supply assembly 330 may be spaced from the upper wall 306 by one or more posts 307 of the fixed housing 302 to form a gap between the power supply assembly 330 and the upper wall 306. Fasteners 311, which may be thread forming fasteners, secure the power supply assembly 330 to the posts 307. The power supply assembly 330 includes a printed circuit board 332 and a power interface 334 for providing electrical power supplied by the movable barrier operator 12 to electrical components of the camera module 300. As discussed in greater detail below, one or more cables 370 (see FIG. 14) are connected to the printed circuit board 332 and extend through the fixed housing 302 and into the rotatable housing 312.

Figure 14:
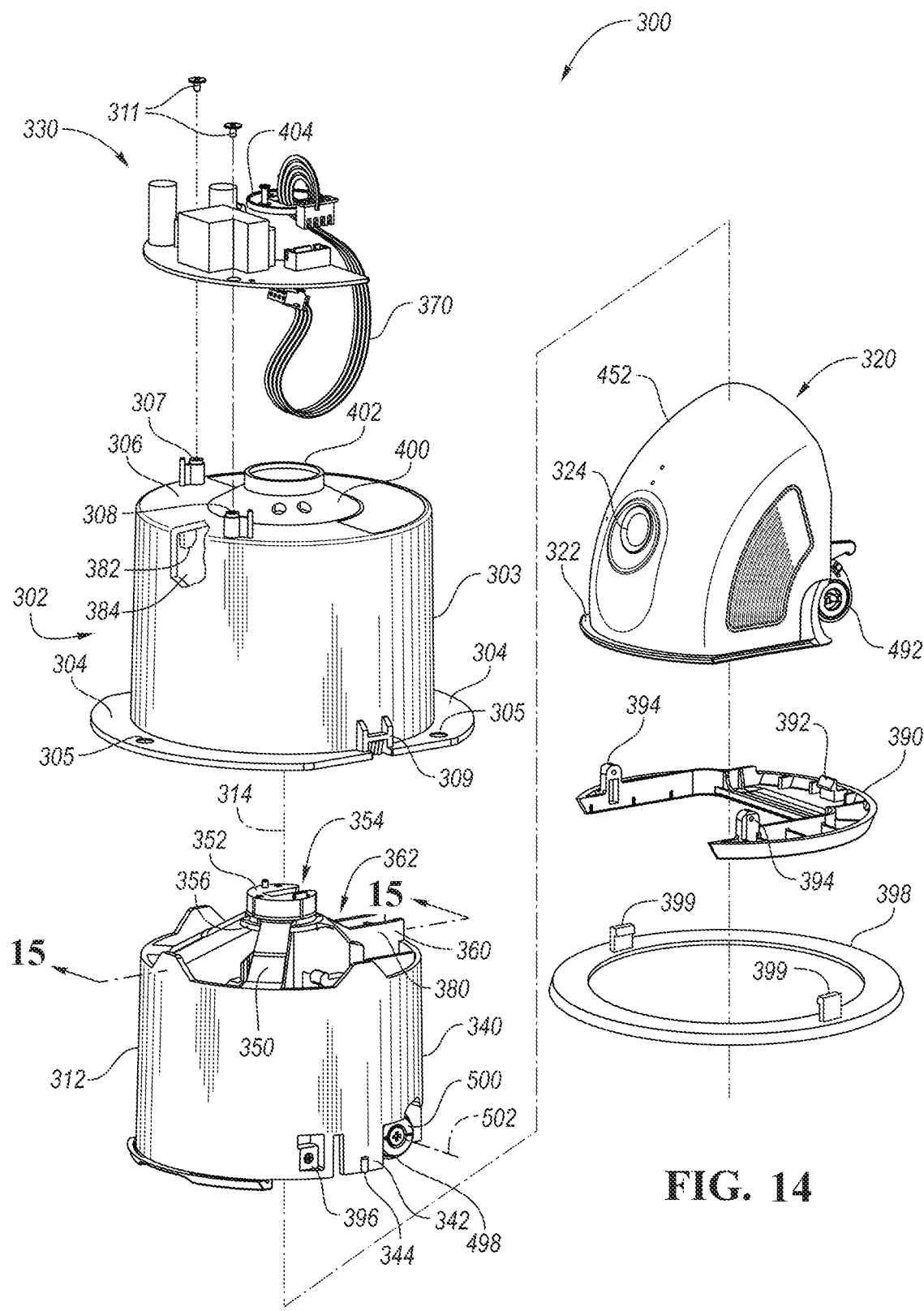
FIG. 14 is an exploded view of the camera module of FIG. 13, the camera module rotated approximately 180 degrees from the orientation of the camera module in FIG. 13, and additionally showing an outer cover that is securable to the camera module.

Referring now to FIG. 14, the rotatable housing 312 has a body 340 that may be generally cylindrical or frustoconical. The body 340 of the rotatable housing 312 is sized to be received in the fixed housing 302. In this way, the body 303 of the fixed housing 302 may guide rotation of the body 340 of the rotatable housing 312 about the axis 314.

Similar to camera module 150, the camera module 300 may include a rotary lock. For example, the rotatable housing 312 may include one or more flexible tabs 342 that may include an engagement interface such as one or more detents 344. The detents 344 are resiliently urged by the tabs 342 into recesses of the fixed housing 302 to resist unintended turning of the rotatable housing 312 and maintain the set pan angle of the camera 324.

Figure 15:
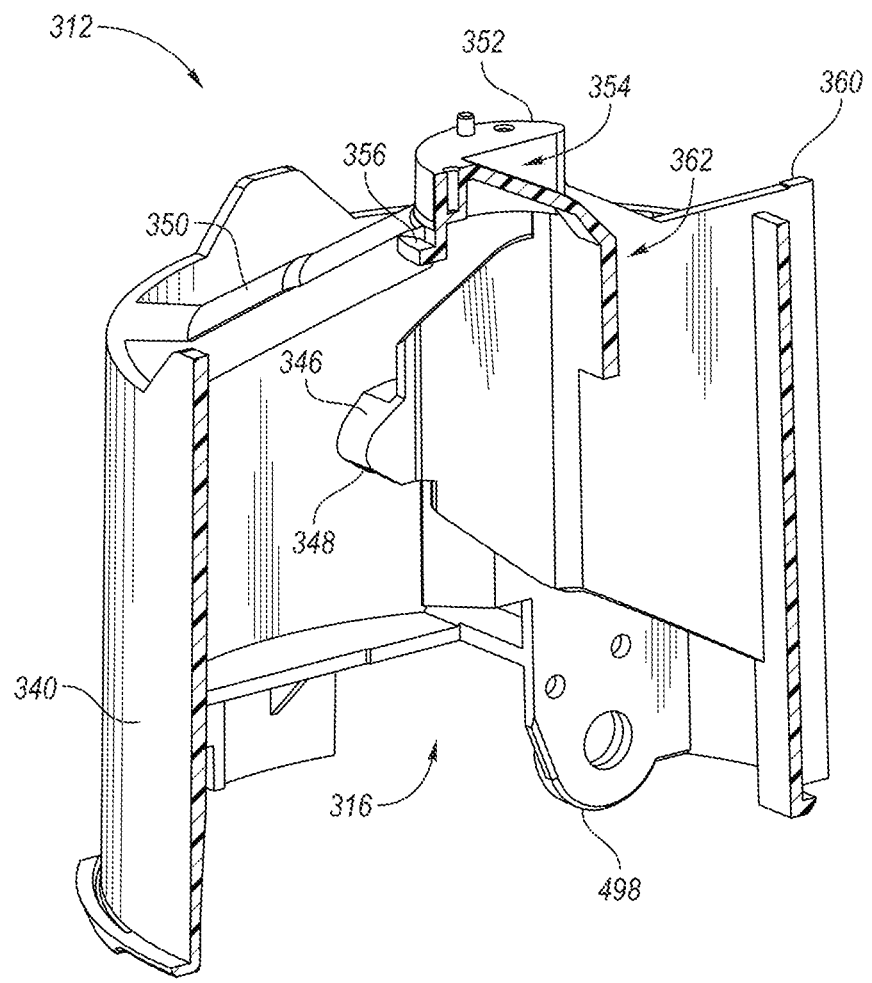
FIG. 15 is a cross-sectional view of a portion of the camera module taken along line 15-15 in FIG. 14.

Referring momentarily to FIG. 15, the rotatable housing 312 may include a switch engaging portion, such as a surface 346 in an internal cavity 316 of the rotatable housing 312. The surface 346 is a surface of a protrusion 348 in the internal cavity 316. As discussed in greater detail below, the camera assembly 320 includes an actuator 624 that engages and disengages from the surface 346 as the camera assembly 320 is moved (e.g., pivoted) between the open and closed positions to turn off and turn on one or more components of the camera assembly 320.

As shown in FIGS. 14 and 15, the rotatable housing 312 may further include one or more support arms 350. The support arms 350 may extend upwardly and inwardly from the body 340 toward a central hub portion 352 of the rotatable housing 312. The central hub portion 352 may be a generally cylindrical or disk-shaped portion, and may define a hub channel 354 therein. One or more flange portions 356 may extend radially-outwardly below the central hub portion 352; for example, between adjacent support arms 350.

The rotatable housing 312 may further include opposing guide walls 360 that cooperate to define a guide channel 362 therebetween. The guide walls 360 extend inwardly from the body 340 of the rotatable housing 312 to the central hub portion 352 such that the guide channel 362 is aligned with the hub channel 354 of the hub portion 352. In this way, one or more electrical connectors, such as cables 370, may extend from the internal cavity 316 of the rotatable housing 312, through the guide channel 362, through the hub channel 354, and to the power supply assembly 330, as discussed in greater detail below.

Referring to FIG. 14, one or both of the guide walls 360 may define a wall abutment portion 380. The wall abutment portions 380 are configured to engage an inwardly-disposed stop member 382, visible through cutout window 384, of the fixed housing 302 to inhibit full rotation of the rotatable housing 312 about the central axis 314. In one embodiment, the rotatable housing 312 has two guide walls 360 such that a first wall abutment portion 380 of one guide wall 360 limits rotation of the rotatable housing 312 in a first rotational direction and a second wall abutment portion 380 of the other guide wall 360 limits rotation of the rotatable housing 312 in a second rotational direction that is opposite the first rotational direction. In this approach, the rotatable housing 312 may rotate, for example, approximately 345 degrees relative to the fixed housing 302, with the remaining range of rotation inhibited by the engagement of the wall abutment portions 380 with the stop member 382 of the fixed housing 302. In another example approach, a single guide wall 360 having opposing wall abutment portions 380 may be provided, and the rotatable housing 312 may rotate approximately 355 degrees to approximately 359 degrees relative to the fixed housing 302. In this way, rotation of the rotatable housing 312 may be limited to less than 360 degrees.

The camera module 300 further includes a bottom cover 390. The bottom cover 390 may be secured to a lower portion of the rotatable housing 312. For example, the bottom cover 390 may include one or more snap-fit tabs 392 that engage a portion of the rotatable housing 312. The bottom cover 390 may further include one or more fastener receiving tabs 394 that may be secured to fastener receiving sockets 396 of the rotatable housing 312 by fasteners. The bottom cover 390 may cover gaps between the camera assembly 320 and the rotatable housing 312, thereby inhibiting debris from entering the internal cavity 316 of the rotatable housing 312.

An outer cover 398 may be secured to the camera module 300, as shown, for example, in FIGS. 11 and 12. The outer cover 398 may be similar in many respects to outer cover 162 discussed with respect to FIGS. 6 and 7. The outer cover 398 may further include one or more snap-fit tabs 399 for securing the outer cover 398 to the fixed housing 302; for example, at snap landings 309.

Figure 16:
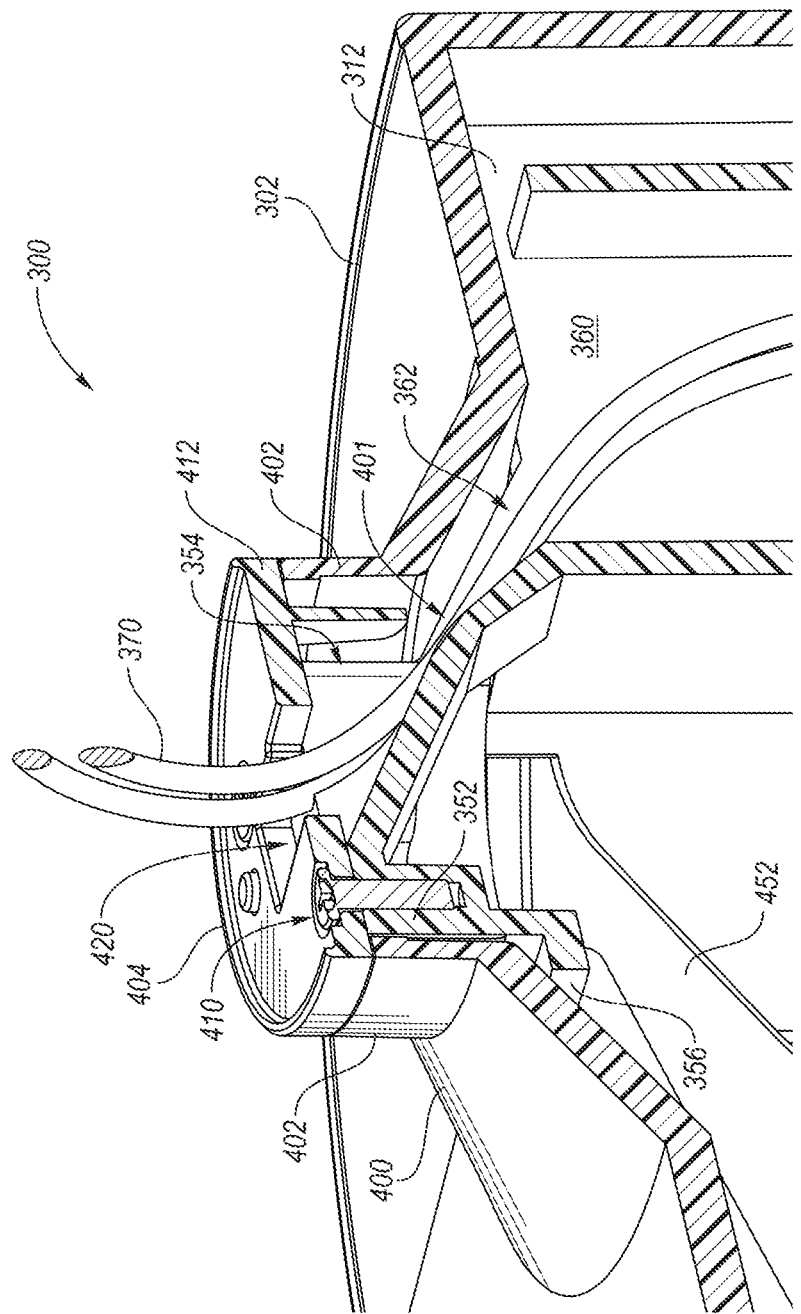
FIG. 16 is a cross-sectional view of an upper portion of the camera module of FIG. 13 showing an annular collar of a fixed housing of the camera module disposed between a flange portion of a rotatable housing of the camera module and a top cover of the camera module.

Referring to FIG. 16, the rotatable housing 312 may be connected to the fixed housing 302 such that the rotatable housing 312 is rotatable relative to the fixed housing 302. For example, the rotatable housing 312 and the fixed housing 302 may form a pivot connection therebetween. In one embodiment, the central hub portion 352 of the rotatable housing 312 is received in a central opening 401 of a tapered collar 400 and an annular collar 402 of the fixed housing 302. The tapered collar 400 extends along and covers the flange portions 356 of the rotatable housing 312 such that axial movement of the rotatable housing 312 in the upward direction is inhibited by the flange portions 356 contacting the underside of the tapered collar 400.

The annular collar 402 has an inner diameter that is slightly greater than outer diameter of the central hub portion 352. In this way, the annular collar 402 forms a rotary connection with the central hub portion 352 and guides rotational movement of the central hub portion 352 as the rotatable housing 312 turns relative to the fixed housing 302.

The camera module 300 includes a top cover 404 extending across the central hub portion 352 and fixedly secured to the central hub portion 352 (e.g., at a fastener receiving region 410). The top cover 404 includes a peripheral portion 412 that extends radially outwardly over the annular collar 402. The annular collar 402 of the fixed housing 302 is captured between the peripheral portion 412 of the top cover 404 and the flange portions 356 of the rotatable housing 312. In this manner, the rotatable housing 312 is constrained to rotary movement. The top cover 404 includes a through opening 420 for receiving conductors such as wires or cables 370 that extend through the hub channel 354.

Figure 17:
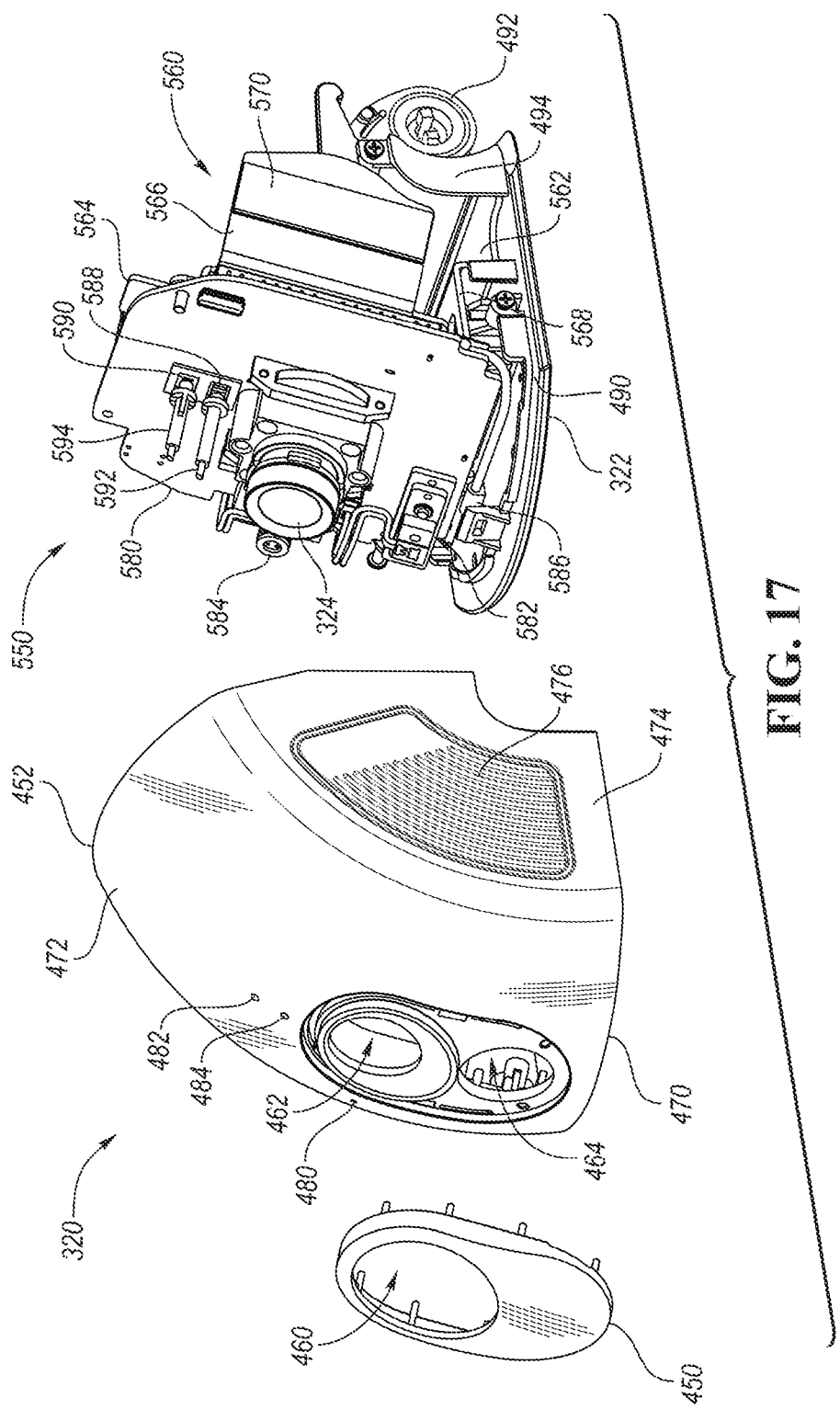
FIG. 17 is an exploded front perspective view of a camera assembly of the camera module of FIG. 13.

Referring now to FIG. 17, the camera assembly 320 includes a cover 450 that is secured to a camera housing 452 of the camera assembly 320 (e.g., through an interference fit engagement). The cover 450 may include a first camera aperture 460 that is generally aligned with a second camera aperture 462 of the camera housing 452 and is also generally aligned with the camera 324. The cover 450 may generally function as an infrared shield.

The camera housing 452 receives various components that are discussed in greater detail below. In this way, the camera housing 452 may act as a shield to seal or otherwise protect various internally-disposed components. The camera housing 452 is configured to be connected to the door 322 with a lower edge 470 of the camera housing 452 seated on a floor portion 490 of the door 322. The camera housing 452 has an arcuate wall 472 that forms the second camera aperture 462, as well as an infrared camera aperture 464, a microphone aperture 480, an LED aperture 482, and an ambient light sensor aperture 484.

The camera housing 452 further includes opposing sidewalls 474. The sidewalls 474 may include grooves 476 that may provide an ergonomic gripping surface to assist a user in pivoting and/or rotating the camera housing 452 relative to the fixed housing 302. Additionally or alternatively, the sidewalls 474 may include channels or apertures that may assist in dissipating heat from the interior of the camera housing 452. At least a portion of at least one sidewall 474 may be resiliently deformable such that the user may press a switch located within the camera housing 452 by pressing on the sidewall 474, as discussed in greater detail below.

Various indicia, such as a MAC (media access control) address, may be provided on a sidewall 474.

Figure 18:
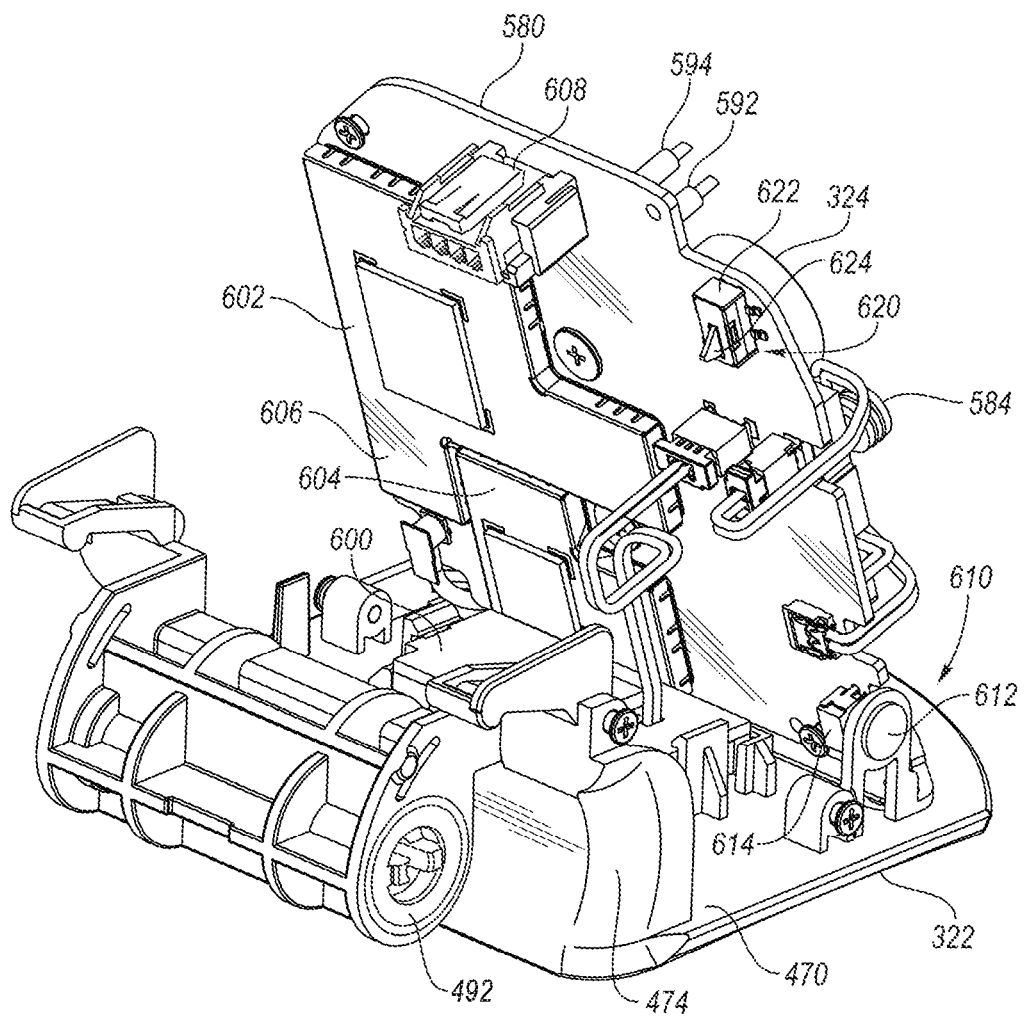
FIG. 18 is a rear perspective of a portion of the camera assembly of FIG. 17 with a heat sink of the camera assembly removed for clarity.

As shown in FIGS. 17 and 18, the door 322 includes a floor portion 490, a friction hinge portion 492 and a connecting portion 494 that extends from the floor portion 490 to the friction hinge portion 492. The floor portion 490 may be generally planar. As shown in FIG. 12, the floor portion 490 may define speaker holes 496 that permit sound to pass from a speaker module through the floor portion 490. The connecting portion 494 may include a curved wall that extends between the floor portion 490 and the friction hinge portion 492.

The friction hinge portion 492 may be similar to friction hinge 168 discussed with respect to FIG. 8. Referring momentarily to FIG. 14, the friction hinge portion 492 may be pivotably secured to a hinge portion 498 of the rotatable housing 312 (e.g., by hinge cap 500) such that the camera assembly 320 is pivotable about a pivot axis 502 relative to the rotatable housing 312. In this way, the friction hinge portion 492 and the hinge portion 498 may cooperate to at least partially form a pivot lock. In one example, the camera assembly 320 may pivot downwardly at least 30 degrees from horizontal to an intermediate position. In another example, the camera assembly 320 may pivot downwardly at least 60 degrees from horizontal to an open position. As such, the friction hinge portion 492 maintains the door 322 and the camera assembly 320 at a closed, intermediate, or open position and resists vibrations caused by operation of the associated movable barrier operator 12. The user force to pivot the camera assembly 320 from a closed position to an intermediate position may be in the range of approximately 0.5 kilogram-force to approximately two kilograms-force, and the user force to pivot the camera assembly 320 from the intermediate position to the open position may be less than one kilogram-force.

Regarding FIG. 17, camera components, indicated generally at 550, may be supported by the door 322; for example, the floor portion 490. The components include a heat sink 560 having a floor portion 562 that is secured to the floor portion 490 of the door 322, a forward-facing portion 564 that extends generally upwardly from the floor portion 562, and one or more side portions 566 that extend rearwardly from the forward-facing portion 564. Other heat sink geometries may be provided. One or more thermal pads 570 may be secured to portions of the heat sink 560 (e.g., at side portions 566) to promote heat dissipation from the camera assembly 320. The heat sink 560 is a structural member that, as discussed in greater detail below, may support various camera components 550 and orients the direction of various camera components 550, such as camera 324.

The camera components 550 include a printed circuit board 580 secured to and supported by the heat sink 560 (e.g., at the forward-facing portion 564 of the heat sink 560). Various ones of the camera components 550, such as the camera 324, may be electrically coupled to the printed circuit board 580. The camera 324 may also be mechanically connected to the printed circuit board 580 such that the camera 324 is generally aligned with the first camera aperture 460 of the cover 450 and the second camera aperture 462 of the camera housing 452. Additional components, including one or more of an infrared light source and camera 582, a microphone 584, an RF antenna 586, an ambient light sensor 588, and one or more LEDs 590, may also be electrically coupled to the printed circuit board 580. The infrared light source and camera 582 may be generally aligned with the infrared camera aperture 464 of the camera housing 452. The microphone 584 may be generally aligned with the microphone aperture 480 of the camera housing 452. The ambient light sensor 588 may be generally aligned with a first light pipe 592, which may be secured to an inner surface of the camera housing 452 at the ambient light sensor aperture 484. The LED 590 may be generally aligned with a second light pipe 594, which may be secured to an inner surface of the camera housing 452 at the LED aperture 482. In one approach, the LED 590 is a multicolor LED configurable to output various colors, as described in greater detail below.

Referring now to FIG. 18, the camera assembly 320 further includes a speaker module 600 that may be secured to the door 322. More particularly, the speaker module 600 may be secured to the floor portion 490 of the door 322 (e.g., below a raised step portion 568 of the floor portion 562, shown in FIG. 17) adjacent to the speaker holes 496 (shown in FIG. 12). The speaker module 600 may be secured to the floor portion 490 by one or more cantilever snap-fit tabs. The camera assembly 320 may further include one or more of a processor 602, a Wi-Fi module 604, a Bluetooth module 606, and a cable terminal 608 for receiving cables 370 to electrically couple the printed circuit board 580 to the printed circuit board 332 of the power supply assembly 330. Other communication circuitry, such as cellular modules, such as ZigBee, Z-wave, WiMax, LoRaWAN, and/or Near Field Communication (NFC) may be provided.

The camera assembly 320 further includes a user input 610. In one embodiment, the user input 610 includes a resilient tab 612 secured to the door 322 (e.g., to the floor portion 490) and a pushbutton switch 614 disposed adjacent to the resilient tab 612 that is electrically coupled to the printed circuit board 580. In this way, a user may urge the resilient tab 612 inwardly (e.g., by pressing on a resiliently deformable sidewall 474 of the camera housing 452) to press the pushbutton switch 614. Pressing the pushbutton switch 614 may cause one or more of the camera components 550 to reset. The user may desire to push the pushbutton switch 614, for example, when the user wishes to reset the camera module 300 (e.g., to clear stored user credentials). The one or more components 550 may be reset when the user presses and holds the pushbutton switch 614 for a predetermined period of time (e.g., five or six seconds).

Regarding FIG. 18, the camera assembly 320 further includes a switch, such as detection switch 620. The detection switch 620 includes a switch housing 622 and an actuator 624 that is movable relative to the switch housing 622. In the approach shown, the actuator 624 is pivotably connected to the switch housing 622 such that the actuator 624 may pivot into the switch housing 622. In another example approach, the actuator 624 may be a pushbutton switch that travels axially relative to the switch housing 622. The actuator 624 may be biased (e.g., spring biased) toward an extended position in which the actuator 624 protrudes outwardly from the switch housing 622. As discussed with respect to FIGS. 19-21, the detection switch 620 operates to inform the processor 602 as to whether the camera assembly 320 is in the closed position.

Figure 19:
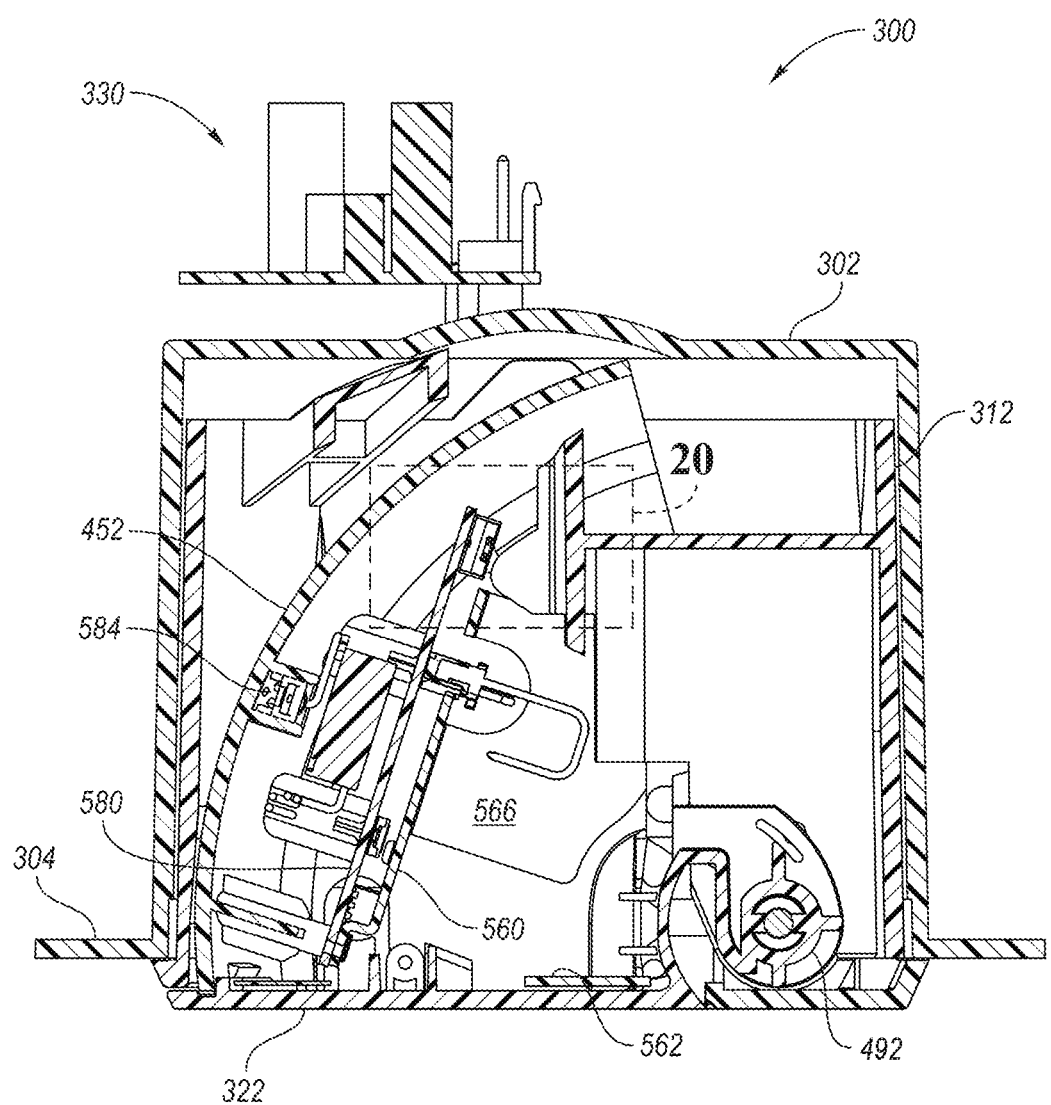
FIG. 19 is a cross-sectional view of the camera assembly taken along the line 19-19 in FIG. 13.
Figure 20:
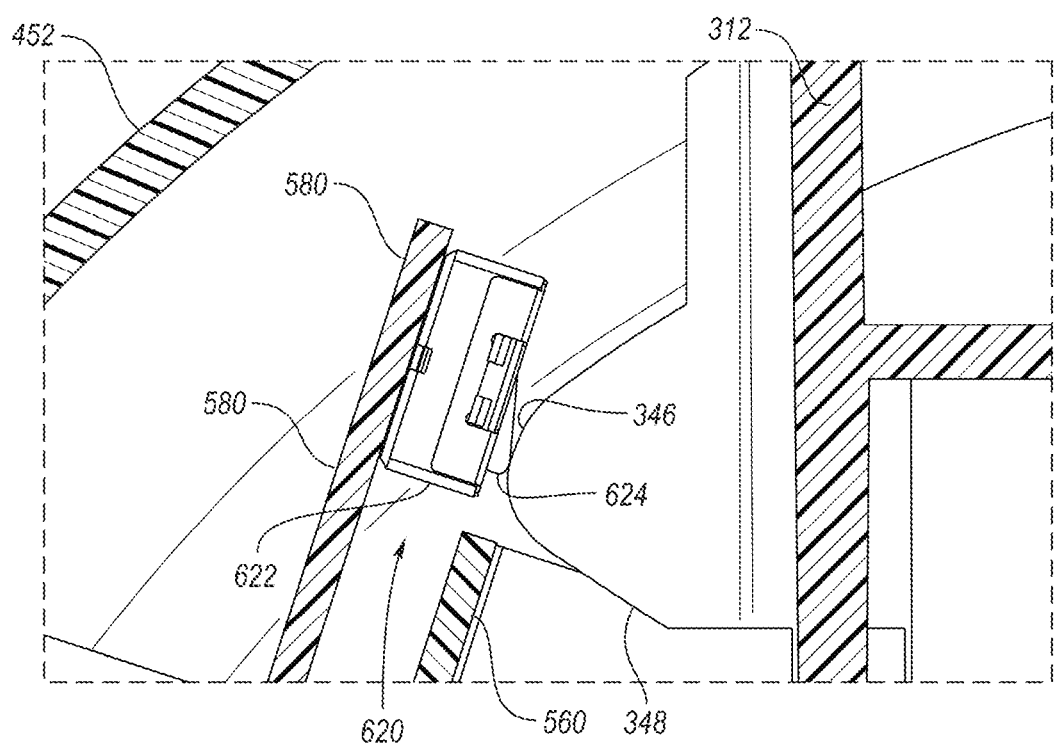
FIG. 20 is an enlarged view of the portion of the camera module in the dashed square of FIG. 19, showing details of an example power switch of the camera module.

Referring now to FIGS. 19 and 20, the camera module 300 is shown with the camera assembly 320 in the closed position. As shown in greater detail in FIG. 20, when the camera assembly 320 is in the closed position, the actuator 624 is depressed by the surface 346 of the protrusion 348 of the rotatable housing 312 such that the actuator 624 is shifted (e.g., pivoted) into the switch housing 622. When the camera assembly 320 is in the closed position (e.g., as indicated when the actuator 624 is shifted into the switch housing 622), various camera components 550 may be turned off or reconfigured to a low power usage state. For example one or more of the camera 324, infrared light source and camera 582, microphone 584, RF antenna 586, ambient light sensor 588, LED 590, speaker module 600, processor 602, and Wi-Fi module 604 may be turned off.

As the camera assembly 320 is pivoted from the closed position to a partially open, intermediate position, the switch housing 622 is moved away from the surface 346 of the protrusion 348. Because the actuator 624 is biased to the extended position thereof, the actuator 624 shifts (e.g., pivots) outwardly away from the switch housing 622 as the camera assembly 320 is pivoted to the intermediate position.

Figure 21:
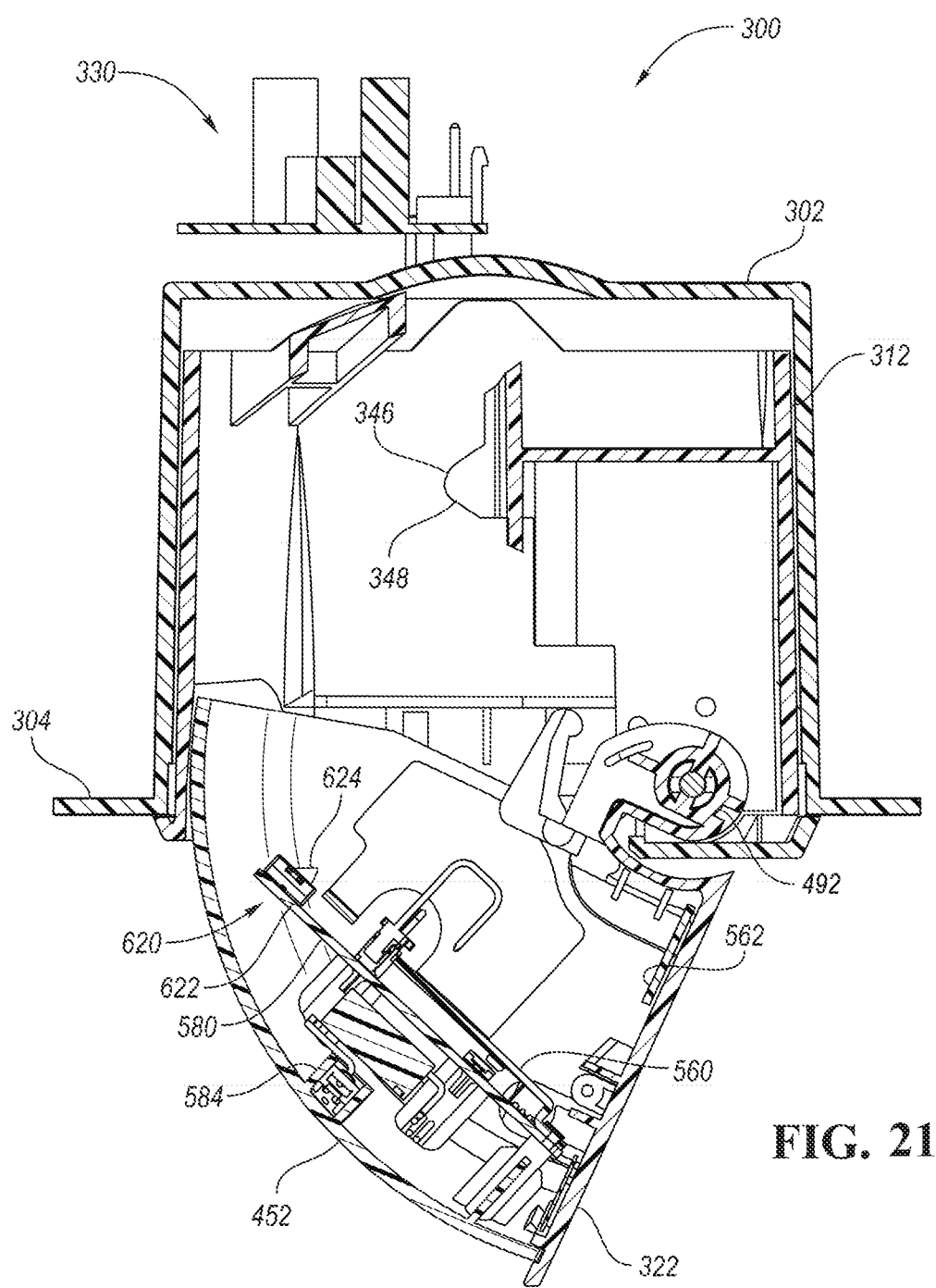
FIG. 21 is a cross-sectional view similar to FIG. 19 showing the camera module in an open or operative configuration.

Referring now to FIG. 21, the camera module 300 is shown with the camera assembly 320 in an open position. In the open position, the actuator 624 is disengaged from the surface 346 of the protrusion 348 of the rotatable housing 312 and is fully extended outwardly from the switch housing 622. When the camera assembly 320 is pivoted away from of the closed position, the actuator 624 shifts outward which closes the detection switch 620 and causes various camera components 550 to be energized.

In one approach, the camera module 300 may be installed on a movable barrier operator 12 prior to the movable barrier operator 12 being installed within a movable barrier environment (e.g., garage 14 of FIG. 1). In another approach, a movable barrier operator 12 may be installed within a movable barrier environment, and the camera module 300 may subsequently be installed as a retrofit into the movable barrier operator 12.

Upon installation, a user may initiate operation of the camera module 300 by tilting the door 322 from the closed position to a lowered position (e.g., an open or intermediate position). As discussed, tilting of the door 322 moves the switch housing 622 of the detection switch 620 away from the surface 346 of the protrusion 348 and causes the actuator 624 to shift outwardly from the switch housing 622 thereby changing a state of the detection switch 620. When the detection switch 620 changes state, the camera module 300 may perform a startup routine.

As discussed, the LED 590 (see FIG. 17) may be a multicolor LED. As such, the LED 590 may be illuminated with selected colors to indicate various operational statuses of the camera module 300 to a user. For example, during the startup routine, the LED 590 may display a first visual indicator, such as a solid white light.

During the startup routine, the processor 602 determines whether the camera module 300 has previously been provisioned or otherwise configured or set up. If the camera module 300 has not been provisioned, the camera module 300 (e.g., the processor 602) may initiate a provisioning routine. The provisioning routine may be performed by the camera module 300 while in communication with a user device (e.g., smartphone, tablet, or computer). Prior to, or during, the provisioning routine, a user may provide authentication information at the user device. This may include registering new authentication information (e.g., registering a new user account), or signing in with previously-registered authentication information. The authentication information may include, for example, a username and password.

During the provisioning routine, the user device attempts to wirelessly discover the camera module 300 such as via Bluetooth. During this discovery phase, the LED 590 may display a second visual indicator, such as a flashing blue light.

Upon discovery of the camera module 300, the user device may prompt the user to connect or pair the user device to the camera module 300. Upon successful pairing of the user device and the camera module 300, the LED 590 may display a third visual indicator, such as a solid blue light.

The provisioning routine may further include sharing local wireless network information from the user device to the camera module 300. In one approach, the user device may automatically share Wi-Fi network information (e.g., service set identifier (SSID) information and corresponding authentication information) with the camera module 300. In another approach, the user device may prompt the user to input authentication information for a Wi-Fi network to which the user desires to connect the camera module 300. The provisioning routine may end when the camera module 300 receives the network information from the user device and when the camera module 300 is in communication with a remote resource (e.g., server computer, middleware, or cloud) via the local wireless network.

In another approach, the provisioning routine may include the camera module 300 receiving local wireless network information from the movable barrier operator 12.

After the provisioning routine, or if the camera module 300 has already been provisioned, the camera module 300 attempts to connect to the local wireless (e.g., Wi-Fi) network. During the attempt to connect to the local wireless network, the LED 590 may display a fourth visual indicator, such as alternating green and blue lights. If the attempt to connect to the Wi-Fi network is unsuccessful, the LED 590 may display the third visual indicator (e.g., the solid blue light) or other visual indicator. If the attempt to connect to the Wi-Fi network is successful, the LED 590 may display a fifth visual indicator, such as a flashing green light.

Upon successfully connecting to the Wi-Fi network, the camera module 300 may attempt to connect to a remote server computer. If the attempt to connect to the remote server computer is successful, the LED 590 may display a sixth visual indicator, such as a solid green light. If the attempt to connect to the remote server computer is unsuccessful, the LED 590 may continue to display the fifth visual indicator (e.g., the flashing green light). The startup routine may be terminated when the camera module 300 successfully connects to the remote server.

As discussed, a user may reset the camera module 300 by, for example, pressing on a resiliently deformable sidewall 474 of the camera housing 452, thereby urging the resilient tab 612 inwardly to press the pushbutton switch 614. In one example, the camera module 300 may enter a reset mode upon the user pressing the pushbutton switch 614 inwardly for a predetermined period of time (e.g., six seconds). When the camera module 300 enters the reset mode, the LED 590 may display a visual indicator (e.g., a flashing blue light).

The LED 590 may display other visual indicators indicative of an operational mode of the camera module 300. For example, during a software or firmware update, the LED 590 may blink a purple light. Upon a temperature sensor of the camera module 300 detecting an overheat condition, the LED 590 may blink a red light. In addition to the LED 590, the camera module 300 may provide user feedback via the speaker module 600.

This disclosure may allow an end user to remotely monitor a garage and garage door via an internet connected smartphone or computer. Additionally, aspects of the present disclosure may facilitate remote control and/or pan-tilt-zoom (PTZ) adjustment of a camera or camera module by an end user. The components described herein also may allow for unattended recording of a garage and event notifications for a garage door and garage space.

The above description is merely exemplary, and those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. It is intended that the phrase "at least one of" as used herein be interpreted in the disjunctive sense. For example, the phrase "at least one of A and B" is intended to encompass only A, only B, or both A and B.

What is claimed is:

1. A movable barrier operator comprising:
   a housing;
   a motor in the housing;
   a controller in the housing operably coupled to the motor;
   a camera operably coupled to the controller; and
   a camera mount configured to facilitate movement of the camera between a storage position wherein at least a portion of the camera is inside the housing and an operative position wherein the at least a portion of the camera is outside of the housing;
   the camera mount comprising:
      a fixed support connected to the housing,
      a rotatable support,
      a rotary connection between the fixed support and the rotatable support that constrains relative movement of the fixed support and the rotatable support to rotary movement of the rotatable support about a rotary axis relative to the fixed support;
      a pivotal support carrying the camera;
      a pivot connection between the rotatable support and the pivotal support that constrains relative movement of the rotatable support and the pivotal support to pivotal movement of the pivotal support about a pivot axis relative to the rotatable support, and
      the rotary connection facilitating rotation of the rotatable support, the pivotal support, the pivot connection, and the camera about the rotary axis with the camera in the operative position.

2. The movable barrier operator of claim 1 further comprising a switch to permit operation of the camera when the camera is oriented by the camera mount in the operative position, the switch to inhibit operation of the camera when the camera is oriented by the camera mount in the storage position.

3. The movable barrier operator of claim 1 wherein the camera mount is configured to limit the rotary movement of the camera to less than 360 degrees around the rotary axis.

4. The movable barrier operator of claim 1 wherein the housing includes a lower wall portion extending about the camera mount; and
   wherein the camera mount includes a lower cover below the camera that is level with the lower wall portion when the camera is in the storage position.

5. The movable barrier operator of claim 1 further comprising at least one light coupled to the housing; and
   wherein the housing includes a light cover portion for illumination by the at least one light of an ambient environment.

6. The movable barrier operator of claim 1 wherein the rotary axis and the pivot axis extend perpendicularly to one another.

7. The movable barrier operator of claim 1 wherein the housing includes a lower wall portion extending about the camera mount and an upper wall portion above the lower wall portion; and
   wherein the rotary axis extends vertically.

8. The movable barrier operator of claim 1 further comprising a cover connected to the housing and having an opening;
   wherein the pivotal support includes a door closing the opening with the camera in the storage position; and
   wherein the pivotal support includes a portion configured to occlude the opening with the camera in the operative position.

9. The movable barrier operator of claim 1 wherein the camera is fixed to the pivotal support.

10. The movable barrier operator of claim 1 wherein the camera is operably coupled to the controller.

11. A movable barrier operator comprising:
    a housing;
    a motor in the housing;
    a controller in the housing operably coupled to the motor;
    a camera operably coupled to the controller;
    a fixed support connected to the housing, at least a portion of the fixed support in the housing;
    a rotatable support rotatably mounted to the fixed support;
    a pivotal support pivotally mounted to the rotatable support and configured to support the camera;
    the rotatable support rotatable relative to the fixed support to adjust the rotatable support to a rotary position relative to the fixed support and set a pan angle of the camera;
    the pivotal support pivotal relative to the rotatable support to adjust the pivotal support to a pivotal position relative to the rotatable support and set a tilt angle of the camera; and
    at least one detent and a plurality of recesses of the rotatable support and the fixed support to maintain the set pan angle of the camera, the at least one detent configured to engage at least one of the plurality of recesses and inhibit turning of the rotatable support relative to the fixed support.

12. The movable barrier operator of claim 11 wherein the pivotal support and the camera supported thereby are pivotal between a storage position wherein at least a portion of the camera is in the housing and an operative position wherein the at least a portion of the camera is outside of the housing.

13. The movable barrier operator of claim 11 wherein the pivotal support and the camera supported thereby are pivotal between a storage position wherein at least a portion of the camera is in the housing and an operative position wherein the at least a portion of the camera is pivoted away from the housing, the movable barrier operator further comprising:
    a switch to permit operation of the camera when the camera is in the operative position, the switch to inhibit operation of the camera when the camera is in the storage position.

14. The movable barrier operator of claim 11 further comprising at least one of a speaker and a microphone.

15. The movable barrier operator of claim 11 wherein the fixed support and the rotatable support have a pivot connection therebetween that includes an opening; and
    an electrical connector extending through the opening of the pivot connection for supplying electrical power to the camera.

16. The movable barrier operator of claim 11 further comprising a pivot lock of the rotatable support and the pivotal support configured to resist pivoting of the pivotal support relative to the rotatable support and maintain the set tilt angle of the camera.

17. The movable barrier operator of claim 16 wherein the pivot lock includes a friction hinge assembly connecting the rotatable support and the pivotal support.

18. The movable barrier operator of claim 17 wherein the friction hinge assembly includes a first surface of the rotatable support, a second surface of the pivotal support, and a friction member sandwiched between the first and second surfaces.

19. A non-transitory computer readable medium comprising instructions which, when executed by a processor of a user device, cause the processor to perform operations comprising:

presenting, via a user interface of the user device, a prompt to manually move a camera of a movable barrier operator from a storage position wherein at least a portion of the camera is inside of a housing of the movable barrier operator and the camera is deenergized to an operating position wherein the at least a portion of the camera has a field of view outside of the housing and the camera is energized, movement of the camera from the storage position to the operating position automatically causing the movable barrier operator to energize the camera; and providing, via the user interface of the user device, at least one of an image, audio, and a video captured by the camera.

20. The non-transitory computer readable medium of claim 19, the operations further comprising providing, at the user interface, an indicium identifying the camera.

21. The non-transitory computer readable medium of claim 19, the operations further comprising communicating a credential from communication circuitry of the user device to the movable barrier operator via a short-range wireless protocol.

22. A movable barrier operator comprising:
a housing;
a motor in the housing;
a controller in the housing;
a camera operably coupled to the controller; and
a camera mount configured to facilitate movement of the camera between a storage position wherein at least a portion of the camera is inside the housing and an operative position wherein the at least a portion of the camera is outside of the housing;
a switch operably coupled to the camera and the camera mount, the switch configured to inhibit operation of the camera with the camera in the storage position; and
the switch configured to facilitate operation of the camera with the camera in the operative position.

23. The movable barrier operator of claim 22 wherein the camera mount includes a rotatable support rotatably connected to the housing; and
a pivotal support pivotally mounted to the rotatable support.

24. The movable barrier operator of claim 23 wherein the switch includes a switch housing and an actuator, wherein the switch housing is secured to one of the pivotal support and the rotatable support and the actuator interacts with the other of the pivotal support and the rotatable support upon movement of the camera from the storage position to the operative position.

* * * * *